US012763835B2

(12) United States Patent
Yuan et al.

(10) Patent No.: US 12,763,835 B2
(45) Date of Patent: Oct. 13, 2026

(54) CSI FEEDBACK METHOD AND APPARATUS, DEVICE, AND READABLE STORAGE MEDIUM

(71) Applicant: VIVO MOBILE COMMUNICATION CO., LTD., Guangdong (CN)

(72) Inventors: Jiangwei Yuan, Guangdong (CN); Yang Song, Guangdong (CN); Peng Sun, Guangdong (CN); Rakesh Tamrakar, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 361 days.

(21) Appl. No.: 18/470,629

(22) Filed: Sep. 20, 2023

(65) Prior Publication Data

US 2024/0007166 A1 Jan. 4, 2024

Related U.S. Application Data

(63) Continuation of application No. PCT/CN2022/081168, filed on Mar. 16, 2022.

(30) Foreign Application Priority Data

Mar. 23, 2021 (CN) ........................ 202110309794.X

(51) Int. Cl.
*H04B 7/06* (2006.01)
*H04W 24/08* (2009.01)

(52) U.S. Cl.
CPC .......... *H04B 7/0626* (2013.01); *H04W 24/08* (2013.01)

(58) Field of Classification Search
CPC .... H04B 7/0626; H04B 7/0486; H04B 7/063; H04B 7/0632; H04W 24/08; H04W 24/10; H04L 1/0026
See application file for complete search history.

(56) References Cited

U.S. PATENT DOCUMENTS

2013/0003788 A1 1/2013 Marinier et al.
2019/0349033 A1* 11/2019 Fakoorian .............. H04B 7/024
(Continued)

FOREIGN PATENT DOCUMENTS

CN 103299558 A 9/2013
CN 108039903 A 5/2018
(Continued)

OTHER PUBLICATIONS

"3rd Generation Partnership Project; Technical Specification Group Radio Access Network; NR; Multiplexing and channel coding (Release 15)", 3GPP TS 38.212 V2.0.0 (Dec. 2017), Valbonne—France.

(Continued)

*Primary Examiner* — Phirin Sam
*Assistant Examiner* — Mang Boi Thawng
(74) *Attorney, Agent, or Firm* — Price Heneveld LLP

(57) ABSTRACT

A CSI feedback method and apparatus, a device, and a readable storage medium are disclosed. The method includes: feeding back, by a terminal, one or more CSI reports to a network-side device, where the CSI report includes a first field corresponding to a first measurement hypothesis, where the first measurement hypothesis includes: X STRP measurement hypotheses and one joint transmission measurement hypothesis, where X is a natural number; or the first measurement hypothesis is one of all STRP measurement hypotheses and joint transmission measurement hypotheses.

20 Claims, 4 Drawing Sheets

(56) References Cited

U.S. PATENT DOCUMENTS

| | | | | |
|---|---|---|---|---|
| 2020/0136682 | A1 | 4/2020 | Faxér et al. | |
| 2020/0244320 | A1 | 7/2020 | Wang et al. | |
| 2021/0028843 | A1* | 1/2021 | Zhou | H04B 7/063 |
| 2022/0256561 | A1* | 8/2022 | Kim | H04L 5/005 |
| 2022/0321175 | A1* | 10/2022 | Tosato | H04L 5/0035 |
| 2023/0028703 | A1* | 1/2023 | Khoshnevisan | H04B 7/024 |
| 2023/0084460 | A1* | 3/2023 | Gao | H04L 5/0057 370/252 |
| 2024/0063870 | A1* | 2/2024 | Gao | H04L 5/0057 |
| 2024/0088967 | A1* | 3/2024 | Gao | H04B 7/024 |
| 2024/0129776 | A1* | 4/2024 | Hindy | H04L 5/0035 |
| 2024/0333353 | A1* | 10/2024 | Hindy | H04B 7/0632 |

FOREIGN PATENT DOCUMENTS

| | | | |
|---|---|---|---|
| CN | 109391404 | A | 2/2019 |
| CN | 110476366 | A | 11/2019 |
| WO | 2020056708 | A1 | 3/2020 |
| WO | 2020056708 | A9 | 3/2020 |
| WO | 2020144602 | A1 | 7/2020 |

OTHER PUBLICATIONS

"3rd Generation Partnership Project; Technical Specification Group Radio Access Network; NR; Physical layer procedures for data (Release 15)", 3GPP TS 38.214 V15.10.0 (Jun. 2020), Valbonne—France.

"3rd Generation Partnership Project; Technical Specification Group Radio Access Network; NR; Multiplexing and channel coding (Release 16)", 3GPP TS 38.212 V16.4.0 (Dec. 2020).

Qualcomm Incorporated, "CSI enhancements: MTRP and FR1 FDD reciprocity", 3GPP TSG RAN WG1 #104-e, R1-2101452, e-Meeting, Jan. 25-Feb. 8, 2021.

Moderator (Huawei, Hisilicon), "Summary of CSI enhancements for MTRP and FDD (Round 4)", 3GPP TSG RAN WG1 #104-e, R1-2102062, e-Meeting, Jan. 25-Feb. 5, 2021.

European Search Report of Application No. 22774104.8 dated Sep. 10, 2025, 11 pages.

Vivo, "Further discussion and evaluation on MTRP CSI and partial reciprocity", 3GPP Draft; R1-2007650, 3rd Generation Partnership Project (3GPP), Mobile Competence Centre ; 650, Route Des Lucioles ; F-06921 Sophia-Antipolis Cedex ;France, vol. RAN WG1, No. e-Meeting; Jan. 25, 2021-Feb. 5, 2021 Jan. 19, 2021 (Jan. 19, 2021), XP051971014.

Mediatek Inc., "CSI enhancement for NCJT and FR1 FDD reciprocity", 3GPP TSG RAN WG1 #104-e, R1-2100583, e-Meeting, Jan. 25-Feb. 5, 2021.

* cited by examiner

CSI FEEDBACK METHOD AND APPARATUS, DEVICE, AND READABLE STORAGE MEDIUM

CROSS-REFERENCE TO RELATED APPLICATIONS

This application is a continuation application of PCT International Application No. PCT/CN2022/081168 filed on Mar. 16, 2022, which claims priority to Chinese Patent Application No. 202110309794.X, filed in China on Mar. 23, 2021, which are incorporated herein by reference in their entireties.

TECHNICAL FIELD

This application pertains to the field of communications technologies, and specifically relates to a channel state information (CSI) feedback method and apparatus, a device, and a readable storage medium.

BACKGROUND

In a multiple transmission and reception points or multiple antenna panels (multi-Transmitting Receiving Point (multi-TRP, MTRP)/multi-panel) scenario, transmission reliability and throughput performance may be improved. For example, a terminal may receive same data or different data from multiple TRPs. An ideal backhaul and a non-ideal backhaul exist between the multiple TRPs. In the non-ideal backhaul, a high latency exists in information exchange between the multiple TRPs, independent scheduling is appropriate, and an acknowledgement (ACK) or a negative acknowledgement (NACK) and a CSI report are fed back to each TRP separately. Usually, this is applicable to multiple downlink control information (DCI) scheduling. To be specific, each TRP transmits a physical downlink control channel (PDCCH) of the TRP, each PDCCH schedules a physical downlink shared channel (PDSCH) of the TRP, and multiple control resource sets (CORESET) configured for the terminal are associated with different radio resource control (RRC) parameters—control resource set pool indices (CORESET PoolIndex) and correspond to different TRPs. Multiple PDSCHs scheduled by multiple DCIs may not overlap or may partially overlap or completely overlap on time-frequency resources. On overlapping time-frequency resources, each TRP performs independent precoding based on its own channel, and the terminal receives multi-layer data streams of the multiple PDSCHs in non-coherent joint transmission (NCJT) mode.

In the ideal backhaul, scheduling information and UE feedback information can be exchanged between the multiple TRPs in real time. Not only the multiple PDSCHs can be scheduled by using the multiple DCIs, but also a PDSCH can be scheduled by using single DCI. The following transmission solutions are included.

(1) Space division multiplexing (SDM): Different data layers of a same transport block (TB) are transmitted from different TRPs through NCJT.

(2) Frequency division multiplexing (FDM): Different frequency domain resources to which a same redundancy version (RV) of a same TB is mapped are transmitted from different TRPs, or different RVs of a same TB are mapped to different frequency domain resources and transmitted from different TRPs.

(3) Time division multiplexing (TTDM): Different RVs of a same TB are repeated from different TRPs for multiple times, for example, repeated in one slot, or repeated in multiple slots.

In this case, an ACK/NACK and a CSI report may be fed back to any TRP.

However, an existing CSI report mapping is mainly designed for one measurement hypothesis and cannot well support multiple measurement hypotheses.

SUMMARY

According to a first aspect, a channel state information CSI feedback method is provided and includes:

feeding back, by a terminal, one or more CSI reports to a network-side device, where the CSI report includes a first field corresponding to a first measurement hypothesis, where the first measurement hypothesis includes: X single transmission and reception point STRP measurement hypotheses and one joint transmission measurement hypothesis, where X is a natural number; or the first measurement hypothesis is one of all STRP measurement hypotheses and joint transmission measurement hypotheses.

According to a second aspect, a CSI feedback method is provided and includes:

receiving, by a network-side device, one or more CSI reports, where the CSI report includes a first field corresponding to a first measurement hypothesis, where the first measurement hypothesis includes: X STRP measurement hypotheses and one joint transmission measurement hypothesis, where X is a positive integer; or the first measurement hypothesis is one of all STRP measurement hypotheses and joint transmission measurement hypotheses.

According to a third aspect, a CSI feedback apparatus is provided. The apparatus is applied to a terminal and includes:

a first sending module, configured to feed back one or more CSI reports to a network-side device, where a first field in the CSI report represents a first measurement hypothesis, where the first measurement hypothesis includes: X STRP measurement hypotheses and one joint transmission measurement hypothesis, where X is a natural number; or the first measurement hypothesis is one of all STRP measurement hypotheses and joint transmission measurement hypotheses.

According to a fourth aspect, a CSI feedback apparatus is provided. The apparatus is applied to a network-side device and includes:

a second receiving module, configured to receive one or more CSI reports, where the CSI report includes a first field corresponding to a first measurement hypothesis, where the first measurement hypothesis includes: X STRP measurement hypotheses and one joint transmission measurement hypothesis, where X is a positive integer; or the first measurement hypothesis is one of all STRP measurement hypotheses and joint transmission measurement hypotheses.

According to a fifth aspect, a terminal is provided and includes a processor, a memory, and a program stored in the memory and capable of running on the processor. When the program is executed by the processor, the steps of the method according to the first aspect are implemented.

According to a sixth aspect, a terminal is provided and includes a processor and a communications interface. The processor is configured to implement the steps of the method according to the first aspect during execution.

According to a seventh aspect, a network-side device is provided and includes a processor, a memory, and a program stored in the memory and capable of running on the processor. When the program is executed by the processor, the steps of the method according to the second aspect are implemented.

According to an eighth aspect, a network-side device is provided and includes a processor and a communications interface. The communications interface is configured to implement the steps of the method according to the second aspect during execution.

According to a ninth aspect, a readable storage medium is provided. The readable storage medium stores a program or instructions. When the program or instructions are executed by a processor, the steps of the method according to the first aspect or the second aspect are implemented.

According to a tenth aspect, a computer program or a program product is provided. The computer program or program product is stored in a non-volatile storage medium. The computer program or program product is executed by at least one processor to implement the steps of the processing method according to the first aspect or the second aspect.

According to an eleventh aspect, a chip is provided. The chip includes a processor and a communications interface. The communications interface is coupled to the processor. The processor is configured to run a program or instructions to implement the processing method according to the first aspect or the second aspect.

According to a twelfth aspect, an embodiment of this application provides an electronic device, configured to perform the steps of the method according to the first aspect or configured to perform the steps of the method according to the second aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specified order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the new radio (NR) system is described for an illustrative purpose, and NR terms are used in most of the following descriptions. These technologies may also be applied to other applications than an NR system application, for example, a 6th Generation (6G) communications system.

Figure 1:
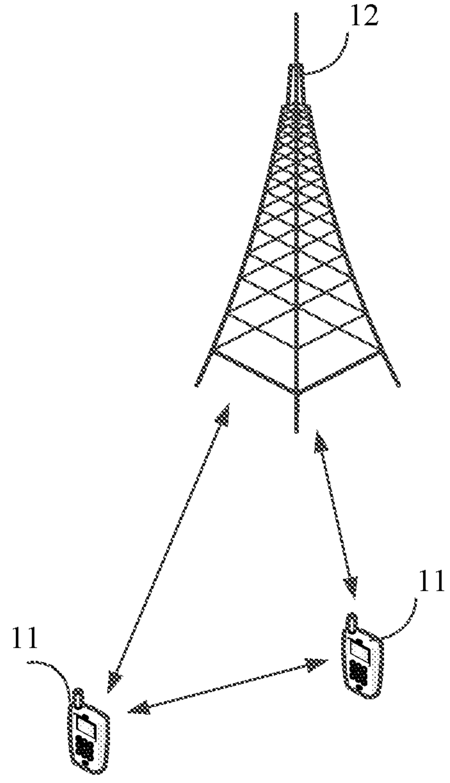
FIG. 1 is a structural diagram of a wireless communications system to which an embodiment of this application can be applied.

FIG. 1 is a structural diagram of a wireless communications system to which an embodiment of this application can be applied. The wireless communications system includes a terminal 11 and a network-side device 12. The terminal 11 may also be referred to as a terminal device or a user terminal (User Equipment, UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, a vehicle user equipment (VUE), or a pedestrian user equipment (PUE). The wearable device includes a smart watch, a smart band, an earphone, glasses, or the like. It should be noted that a specific type of the terminal 11 is not limited in the embodiments of this application.

The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a Wireless Fidelity (Wi-Fi) node, a transmission and reception point (TRP), a wireless access network node, or another appropriate term in the art. As long as the same technical effect is achieved, the base station is not limited to specific technical terms. It should be noted that in the embodiments of this application, only a base station in an NR system is used as an example, but a specific type of the base station is not limited.

A CSI feedback method and apparatus, a device, and a readable storage medium provided in embodiments of this application are hereinafter described in detail by using some embodiments and application scenarios thereof with reference to the accompanying drawings.

Figure 2:
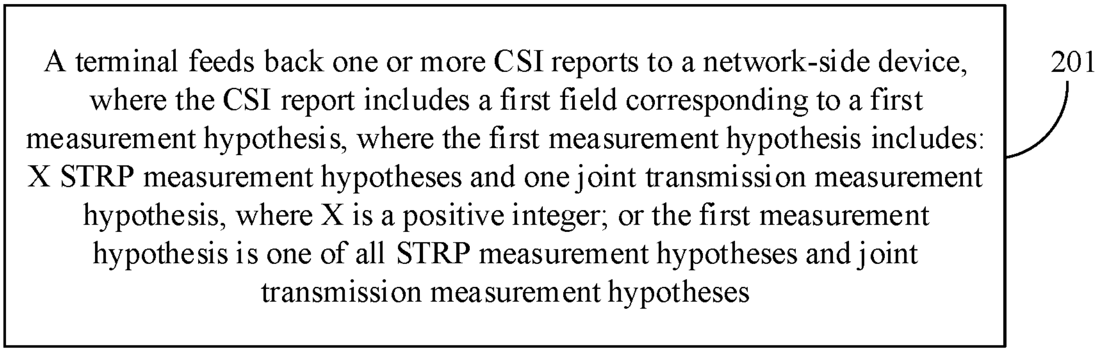
FIG. 2 is a first flowchart of a CSI feedback method according to an embodiment of this application.

Referring to FIG. 2, an embodiment of this application provides a CSI feedback method. A specific procedure includes step 201.

Step 201: A terminal feeds back one or more CSI reports to a network-side device, where the CSI report includes a first field corresponding to a first measurement hypothesis, where the first measurement hypothesis includes: X STRP (single TRP, STRP) measurement hypotheses and one joint transmission measurement hypothesis, where X is a natural number, that is, X=0, 1, 2, 3, . . . ; or the first measurement hypothesis is one of all STRP measurement hypotheses and joint transmission measurement hypotheses.

Optionally, some CSI information or CSI content (such as a rank indicator, a channel state information reference signal resource indicator, or a precoding matrix indicator) obtained based on the first measurement hypothesis is mapped to the first field.

Optionally, the first measurement hypothesis includes one joint transmission measurement hypothesis; or the first measurement hypothesis includes one STRP measurement hypothesis and one joint transmission measurement hypothesis; or the first measurement hypothesis includes two STRP measurement hypotheses and one joint transmission measurement hypothesis.

Optionally, the first measurement hypothesis is an optimal one of all the STRP measurement hypotheses and joint transmission measurement hypotheses. For example, there are STRP measurement hypothesis 1, STRP measurement hypothesis 2, STRP measurement hypothesis 3, joint transmission measurement hypothesis 1, and joint transmission measurement hypothesis 2, where if STRP measurement hypothesis 3 is an optimal measurement hypothesis, STRP measurement hypothesis 3 is used as the first measurement hypothesis.

Joint transmission (JT) in this specification may include non-coherent joint transmission (NCJT) and coherent joint transmission (CJT).

In an implementation of this application, in a case that the first field is a rank indicator (RI) field and that the first measurement hypothesis is one of all the STRP measurement hypotheses and joint transmission measurement hypotheses, a bitwidth of the RI field (field) is determined based on one or more of the following:

(1) a quantity of antenna ports, for example, one antenna port, two antenna ports, four antenna ports, or more than four antenna ports;

(2) a bitwidth corresponding to a quantity of rank indicators allowed for STRP transmission;

(3) a bitwidth corresponding to a quantity of rank indicators allowed for joint transmission;

(4) a total quantity of rank indicators supported by the terminal; and (5) a total quantity of rank indicator combinations supported by the terminal.

The total quantity of rank indicators supported by the terminal may be understood as the quantity of rank indicators supported by the terminal for STRP transmission, and/or the quantity of rank indicators supported for joint transmission. The total quantity of rank indicator combinations supported by the terminal may be understood as the quantity of rank indicator combinations supported by the terminal for STRP transmission, and/or the quantity of rank indicator combinations supported for joint transmission. Support may also be understood as allow.

In an implementation of this application, the bitwidth of the RI field is one of the following:

(1) A first value, where the first value includes 0, or $\min(1, \max(\lceil\log_2 N_{RI}\rceil_{trp1_{strp}}, \ldots, \lceil\log_2 n_{RI}\rceil_{trpN_{strp}}, \lceil\log_2 n_{RI}\rceil_{trp1_{jt}} + \ldots + \lceil\log_2 n_{RI}\rceil_{trpNjt}))$, or $\min(2, \max(\lceil\log_2 N_{RI}\rceil_{trp1_{strp}}, \ldots, \lceil\log_2 N_{RI}\rceil_{trpN_{strp}}, \lceil\log_2 n_{RI}\rceil_{trp1_{jt}} + \lceil\log_2 N_{RI}\rceil_{trpN_{jt}}))$, or $\min(3, \max(\lceil\log_2 N_{RI}\rceil_{trp1_{strp}}, \ldots, \lceil\log_2 n_{RI}\rceil_{trpN_{strp}}, \lceil\log_2 n_{RI}\rceil_{trp1_{jt}} + \ldots + \lceil\log_2 N_{RI}\rceil_{trpN_{jt}}))$, or $\min(4, \max(\lceil\log_2 N_{RI}\rceil_{trp1_{strp}}, \ldots, \lceil\log_2 n_{RI}\rceil_{trpN_{strp}}, \lceil\log_2 n_{RI}\rceil_{trp1_{jt}} + \ldots + \lceil\log_2 n_{RI}\rceil_{trpN_{jt}}))$, or $\max(\lceil\log_2 n_{RI}\rceil_{trp1_{strp}}, \ldots, \lceil\log_2 N_{RI}\rceil_{trpN_{strp}}, \lceil\log_2 n_{RI}\rceil_{trp1_{jt}} + \ldots + \lceil\log_2 N_{RI}\rceil_{trpN_{jt}})$.

Using N=2 as an example, when each of two TRPs has only one antenna port, the bitwidth of the RI field is 0;

when one TRP has only one antenna port, and the other TRP has two antenna ports, the bitwidth is:

$$\min(1,\max(\lceil\log_2 N_{RI}\rceil_{trp1_{strp}},\lceil\log_2 N_{RI}\rceil_{trp2_{strp}},\lceil\log_2 n_{RI}\rceil_{trp1_{jt}}+\lceil\log_2 N_{RI}\rceil_{trp2_{jt}}));$$

when one TRP has two antenna ports, and the other TRP has two antenna ports, the bitwidth is:

$$\min((2,\max(\lceil\log_2 N_{RI}\rceil_{trp1_{strp}},\lceil\log_2 N_{RI}\rceil_{trp2_{strp}},\lceil\log_2 N_{RI}\rceil_{trp1_{jt}}+\lceil\log_2 N_{RI}\rceil_{trp2_{jt}})));$$

when one TRP has two antenna ports, and the other TRP has four antenna ports, the bitwidth is:

$$\min(3,\max(\lceil\log_2 n_{RI}\rceil_{trp1_{strp}},\lceil\log_2 n_{RI}\rceil_{trp2_{strp}},\lceil\log_2 n_{RI}\rceil_{trp1_{jt}}+\lceil\log_2 n_{RI}\rceil_{trp2_{jt}}));$$

when one TRP has four antenna ports, and the other TRP has four antenna ports, the bitwidth is:

$$\min(4,\max(\lceil\log_2 n_{RI}\rceil_{trp1_{strp}},\lceil\log_2 n_{RI}\rceil_{trp2_{strp}},\lceil\log_2 n_{RI}\rceil_{trp1_{jt}}+\lceil\log_2 n_{RI}\rceil_{trp2_{jt}});\text{ or}$$

when each TRP has more than four antenna ports, the bitwidth is:

$$\max(\lceil\log_2 n_{RI}\rceil_{trp1_{strp}},\lceil\log_2 n_{RI}\rceil_{trp2_{strp}},\lceil\log_2 n_{RI}\rceil_{trp1_{jt}}+\lceil\log_2 n_{RI}\rceil_{trp2_{jt}}).$$

(2) A second value, where e second value includes 0, or $\min(1, \max(\lceil\log_2 n_{RI}\rceil_{trp1_{strp}}, \ldots, \lceil\log_2 n_{RI}\rceil_{trpN_{strp}}, \lceil\log_2 N_{RI\_jt}\rceil))$, or $\min(2, \max(\lceil\log_2 n_{RI}\rceil_{trp1_{strp}}, \ldots, \lceil\log_2 n_{RI}\rceil_{trpN_{strp}}, \lceil\log_2 N_{RI\_jt}\rceil))$, or $\min(3, \max(\lceil\log_2 n_{RI}\rceil_{trp1_{strp}}, \ldots, \lceil\log_2 n_{RI}\rceil_{trpN_{strp}}, \lceil\log_2 N_{RI\_jt}\rceil))$, or $\min(4, \max(\lceil\log_2 n_{RI}\rceil_{trp1_{strp}}, \ldots, \lceil\log_2 N_{RI\_jt}\rceil))$, or $\max(\lceil\log_2 n_{RI}\rceil_{trp1_{strp}}, \ldots, \lceil\log_2 N_{RI\_jt}\rceil)$, where $N_{RI\_jt}$ represents the total quantity of supported rank indicator combinations.

(3) A third value, where the third value includes 0 or $\lceil\log_2 N_{RI}\rceil$, where $N_{RI}$ represents the total quantity of supported rank indicators or rank indicator combinations, where $\lceil\log_2 n_{RI}\rceil_{trp1_{strp}}$ represents a bitwidth corresponding to a quantity of rank indicators allowed for STRP transmission of a first TRP, $\lceil\log_2 n_{RI}\rceil_{trp1_{ncjt}}$ represents a bitwidth corresponding to a quantity of rank indicators allowed for joint transmission of the first TRP, $\lceil\log_2 n_{RI}\rceil_{trpN_{strp}}$ represents a bitwidth corresponding to a quantity of rank indicators allowed for STRP transmission of an $N^{th}$ TRP, $\lceil\log_2 n_{RI}\rceil_{trpN_{ncjt}}$ represents a bitwidth corresponding to a quantity of rank indicators allowed for joint transmission of the $N^{th}$ TRP, and N is greater than or equal to 2.

It may be understood that the $N^{th}$ TRP represents the N-th TRP. For example, if N is equal to 2, TRP 2 or the second TRP is identified.

In an implementation of this application, in a case that the bitwidth of the RI field is the first value, if the first measurement hypothesis is an STRP measurement hypothesis, one code point (codepoint) of the RI field corresponds to one rank indicator, or if the first measurement hypothesis is a joint transmission measurement hypothesis, first $\lceil \log_2 n_{RI} \rceil_{trp1_{jt}}$ bits of the RI field correspond to one rank indicator of the first TRP, and $\lceil \log_2 n_{RI} \rceil_{trpN_{jt}}$ bits after the first $\lceil \log_2 n_{RI} \rceil_{trp1_{jt}}$ bits correspond to one rank indicator of the $N^{th}$ TRP, or first $\lceil \log_2 n_{RI} \rceil_{trp1_{jt}}$ bits of the RI field correspond to one rank indicator of the first TRP, and last $\lceil \log_2 n_{RI} \rceil_{trpN_{jt}}$ bits of the RI field correspond to one rank indicator of the $N^{th}$ TRP.

In an implementation of this application, in a case that the bitwidth of the RI field is the second value, if the first measurement hypothesis is an STRP measurement hypothesis, one code point of the RI field corresponds to one rank indicator, or if the first measurement hypothesis is a joint transmission measurement hypothesis, one code point of the RI field corresponds to a group of rank indicators.

For example, a group of rank indicators is shown in Table 1. When the joint transmission measurement hypothesis is reported, if an index value indicated by the RI field is 2, it means that a group of rank indicators for JT transmission is 2 and 1.

TABLE 1

Correspondence between an index and a group of rank indicators

| Index | Rank indicator |
|---|---|
| 0 | (1, 1) |
| 1 | (1, 2) |
| 2 | (2, 1) |
| 3 | (2, 2) |
| . . . | . . . |

In an implementation of this application, in a case that the bitwidth of the RI field is the third value, one code point of the RI field corresponds to one rank indicator or corresponds to a group of rank indicators.

For example, one rank indicator or a group of rank indicators is shown in Table 2. When an index value indicated by the RI field is 2, it means STRP transmission and a rank indicator is 3. When an index value indicated by the RI field is 10, it means JT transmission, and a group of rank indicators is 2 and 1.

TABLE 2

Correspondence between an index and a rank indicator

| Index | Rank indicator |
|---|---|
| 0 | 1 |
| 1 | 2 |
| 2 | 3 |
| 3 | 4 |
| 4 | 5 |
| 5 | 6 |
| 6 | 7 |
| 7 | 8 |
| 8 | (1, 1) |
| 9 | (1, 2) |
| 10 | (2, 1) |
| 11 | (2, 2) |
| 12 | — |
| 13 | — |
| 14 | — |
| 15 | — |

In an implementation of this application, in a case that the first measurement hypothesis is one of all the STRP measurement hypotheses and joint transmission measurement hypotheses, a bitwidth of a channel state information reference signal resource indicator (CSI-RS resource indicator, CRI) field in the CSI report is $\lceil \log_2(K_s+N) \rceil$, where $K_s$ represents a quantity of channel measurement resources associated with a reporting setting, and N represents a quantity of channel measurement resource (CMR) pairs associated with the reporting setting.

One CMR pair is used to measure one joint transmission measurement hypothesis, that is, N may represent a quantity of joint transmission measurement hypotheses to be measured.

In an implementation of this application, the method further includes:

in a case that the first measurement hypothesis is one of all the STRP measurement hypotheses and joint transmission measurement hypotheses, the terminal indicates, to the network-side device by using the first field in the CSI report, that a type of the first measurement hypothesis is an STRP measurement hypothesis or a joint transmission measurement hypothesis.

The first field is one of the following:

(1) A CRI Field

For example, when $K_s=2$ and N=1, the CRI field is defined in the foregoing manner. CRI0 represents CMR1, CRI1 represents CMR2, and CRI2 represents CMR1 and CMR2. Therefore, CRI2 reported by a user represents a joint transmission measurement hypothesis.

(2) An RI Field

The RI field is defined in the foregoing manner.

Alternatively, an RI combination in another manner is used for indication. For example, when $K_s=2$ and N=1, the user reports RI1=0 and RI2=1, where only RI2 is a valid value. In this case, the user reports an STRP measurement hypothesis, which corresponds to a TRP corresponding to RI2. If the user reports RI1=1 and RI2=1, both of which are valid values, the user reports a joint transmission measurement hypothesis.

The valid value may be determined based on one or more of an RI limitation, a quantity of ports, and an RI combination supported for joint transmission.

(3) a Newly Defined Indicator Field

For example, the newly defined indicator field is a joint transmission indicator field (JT Indicator field). When $K_s=2$ and N=1, the CRI field is defined as CRI0 to represent CMR1 or CRI1 to represent CMR2. Therefore, when the user reports CRI0 and an STRP transmission hypothesis, the joint transmission indicator field is 0; or when the user reports CRI0 and a joint transmission hypothesis, the joint transmission indicator field is 1.

In an implementation of this application, in a case that the first measurement hypothesis includes the X STRP measurement hypotheses and the one joint transmission measurement hypothesis, a quantity of RI fields in the CSI report is:

(1) X+1, where X RI fields correspond to the X STRP measurement hypotheses, and one RI field corresponds to the one joint transmission measurement hypothesis;

(2) X+2, where X RI fields correspond to the X STRP measurement hypotheses, and two RI fields correspond to the one joint transmission measurement hypothesis;

(3) 1, where one RI field corresponds to the X STRP measurement hypotheses and the one joint transmission measurement hypothesis; or (4) 2, where one RI field corresponds to the X STRP measurement hypotheses, and one RI field corresponds to the one joint transmission measurement hypothesis.

In an implementation of this application, in a case that the quantity of RI fields is X+1 or X+2, a sequence of mapping the joint transmission measurement hypothesis and STRP measurement hypotheses to the RI fields includes: the joint transmission measurement hypothesis takes precedence over the STRP measurement hypotheses, or the STRP measurement hypotheses take precedence over the joint transmission measurement hypothesis.

In an implementation of this application, in a case that the quantity of RI fields is X+1, a first RI field corresponds to the one joint transmission measurement hypothesis, and a bitwidth of the first RI field is determined based on one or more of the following:

(1) a quantity of antenna ports, for example, one antenna port, two antenna ports, four antenna ports, or more than four antenna ports;

(2) a bitwidth corresponding to a quantity of rank indicators allowed for joint transmission;

(3) a total quantity of rank indicators supported by the terminal; and (4) a total quantity of rank indicator combinations supported by the terminal.

The total quantity of rank indicators supported by the terminal may be understood as the quantity of rank indicators supported by the terminal for joint transmission. The total quantity of rank indicator combinations supported by the terminal may be understood as the quantity of rank indicator combinations supported by the terminal for joint transmission. Support may also be understood as permission.

In an implementation of this application, the bitwidth of the first RI field is one of the following:

(1) a fourth value, where the fourth value includes 0, or $\min(1, \lceil \log_2 n_{RI} \rceil_{trp1_{jt}} + \ldots + \lceil \log_2 n_{RI} \rceil_{trpN_{jt}})$, or $\min(2, \lceil \log_2 n_{RI} \rceil_{trp1_{jt}} + \ldots + \lceil \log_2 n_{RI} \rceil_{trpN_{jt}})$, or $\min(3, \lceil \log_2 n_{RI} \rceil_{trp1_{jt}} + \ldots + \lceil \log_2 n_{RI} \rceil_{trpN_{jt}})$ or, $\min(4, \lceil \log_2 n_{RI} \rceil_{trp1_{jt}} + \ldots + \lceil \log_2 n_{RI} \rceil_{trpN_{jt}})$, or $\lceil \log_2 n_{RI} \rceil_{trp1_{jt}} + \ldots + \lceil \log_2 n_{RI} \rceil_{trpN_{jt}}$, where $\lceil \log_2 n_{RI} \rceil_{trp1_{jt}}$ represents a bitwidth corresponding to a quantity of rank indicators allowed for joint transmission of a first TRP, and $\lceil \log_2 n_{RI} \rceil_{trpN_{jt}}$ represents a bitwidth corresponding to a quantity of rank indicators allowed for joint transmission of an $N^{th}$ TRP; and (2) a fifth value, where the fifth value includes 0, or $\min(1, \lceil \log_2 N_{RI\_jt} \rceil)$, or $\min(2, \lceil \log_2 N_{RI\_jt} \rceil)$, or $\min(3, \lceil \log_2 N_{RI\_jt} \rceil)$, or $\min(4, \lceil \log_2 N_{RI\_jt} \rceil)$, or $\lceil \log_2 N_{RI\_jt} \rceil$, where $N_{RI\_jt}$ represents the total quantity of supported rank indicator combinations.

In an implementation of this application, in a case that the bitwidth of the first RI field is the fourth value, (1) first $\lceil \log_2 n_{RI} \rceil_{trp1_{jt}}$ bits of the first RI field correspond to one rank indicator of the first TRP, and $\lceil \log_2 n_{RI} \rceil_{trp2_{jt}}$ bits after the first $\lceil \log_2 n_{RI} \rceil_{trp1_{jt}}$ bits correspond to one rank indicator of the second TRP, by analogy, a similar correspondence is given to one rank indicator of the $N^{th}$ TRP; or (2) first $\lceil \log_2 n_{RI} \rceil_{trp1_{jt}}$ bits of the first RI field correspond to one rank indicator of the first TRP, and last $\lceil \log_2 n_{RI} \rceil_{trp2_{jt}}$ bits of the first RI field correspond to one rank indicator of a second TRP; or (3) in a case that the bitwidth of the first RI field is the fifth value, one code point (codepoint) of the first RI field corresponds to a group of rank indicators, where N is greater than or equal to 2.

For example, a group of rank indicators is shown in Table 3. When the NCJT measurement hypothesis is reported, if an index value indicated by the RI field is 2, it means that a group of rank indicators for NCJT transmission is 2 and 1.

TABLE 3

Correspondence between an index and a rank indicator

| Index | Rank indicator |
|---|---|
| 0 | (1, 1) |
| 1 | (1, 2) |
| 2 | (2, 1) |
| 3 | (2, 2) |
| . . . | . . . |

In an implementation of this application, in a case that the quantity of RI fields is X+1 or X+2, and X=1, a second RI field corresponds to one STRP measurement hypothesis, and a bitwidth of the second RI field is determined based on one or more of the following:

(1) a quantity of antenna ports, for example, one antenna port, two antenna ports, four antenna ports, or more than four antenna ports; and (2) a bitwidth corresponding to a quantity of rank indicators allowed for STRP transmission.

In an implementation of this application, the bitwidth of the second RI field is a sixth value; and the sixth value includes 0, or $\min(1, \max(\lceil \log_2 n_{RI} \rceil_{trp1_{strp}}, \ldots, \lceil \log_2 n_{RI} \rceil_{trpN_{strp}}))$, or $\min(2, \max(\lceil \log_2 n_{RI} \rceil_{trp1_{strp}}, \ldots, \lceil \log_2 n_{RI} \rceil_{trpN_{strp}}))$, or $\min(3, \max(\lceil \log_2 n_{RI} \rceil_{trp1_{strp}}, \ldots, \lceil \log_2 n_{RI} \rceil_{trpN_{strp}})$, or $\min(4, \max(\lceil \log_2 n_{RI} \rceil_{trp1_{strp}}, \ldots$, $\max(\lceil \log_2 n_{RI} \rceil_{trp1_{strp}}, \ldots, \lceil \log_2 n_{RI} \rceil_{trpN_{strp}})$, where $\lceil \log_2 n_{RI} \rceil_{trp1_{strp}}$ represents a bitwidth corresponding to a quantity of rank indicators allowed for STRP transmission of a first TRP, and $\lceil \log_2 n_{RI} \rceil_{trpN_{strp}}$ represents a bitwidth corresponding to a quantity of rank indicators allowed for STRP transmission of an $N^{th}$ TRP; and or N is greater than or equal to 2.

In an implementation of this application, in a case that there is only one RI field, a bitwidth of the RI field is determined based on one or more of the following:

(1) a quantity of antenna ports, for example, one antenna port, two antenna ports, four antenna ports, or more than four antenna ports;

(2) a bitwidth corresponding to a quantity of rank indicators allowed for STRP transmission;

(3) a total quantity of rank indicator combinations supported by the terminal; and (4) a bitwidth corresponding to a quantity of rank indicators allowed for joint transmission.

The total quantity of rank indicator combinations supported by the terminal may be understood as the quantity of rank indicator combinations supported by the terminal for STRP transmission, and/or the quantity of rank indicator combinations supported for joint transmission. Support may also be understood as allow.

In an implementation of this application, the bitwidth of the RI field is one of the following:

(1) a seventh value, where the seventh value includes 0, or $\min(1, \lceil \log_2 n_{RI} \hbar_{trp1_{strp}} + \ldots + \lceil \log_2 n_{RI} \rceil_{trpN_{strp}} + \lceil \log_2 n_{RI} \rceil_{trp1_{jt}} + \ldots + \lceil \log_2 n_{RI} \rceil_{trpN_{jt}})$, or $\min(2, \lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{jt}} + \ldots + \lceil \log_2 n_{RI} \rceil_{trpN_{jt}})$, or $\min(3, \lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{jt}} + \ldots + \lceil \log_2 n_{RI} \rceil_{trpN_{jt}})$, or min(4, $\lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{jt}} + \ldots + \lceil \log_2 n_{RI} \rceil_{trpN_{jt}})$, $\lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{ncjt}} + \ldots + \lceil \log_2 n_{RI} \rceil_{trpN_{jt}}$; and (2) an eighth value, where the eighth value includes 0, or $\min(1, \lceil \log_2 n_{RI} \rceil_{trp1_{strp}} + \ldots + \lceil \log_2 n_{RI} \rceil_{trpN_{strp}} + \lceil \log_2 N_{RI\_jt} \rceil)$, or $\min(2, \lceil \log_2 n_{RI} \rceil_{trp1_{strp}} + \ldots + \lceil \log_2 n_{RI} \rceil_{trpN_{strp}} + \lceil \log_2 N_{RI\_jt} \rceil)$, or $\min(3, \lceil \log_2 n_{RI} \rceil_{trp1_{strp}} + \ldots + \lceil \log_2 n_{RI} \rceil_{trpN_{strp}} + \lceil \log_2 N_{RI\_jt} \rceil)$, or $\min(4, \lceil \log_2 n_{RI} \rceil_{trp1_{strp}} + \ldots + \lceil \log_2 n_{RI} \rceil_{trpN_{strp}} + \lceil \log_2 N_{RI\_jt} \rceil)$, or $\lceil \log_2 n_{RI} \rceil_{trp1_{strp}} + \ldots + \lceil \log_2 n_{RI} \rceil_{trpN_{strp}} + \lceil \log_2 N_{RI\_jt} \rceil$, where $N_{RI\_jt}$ represents the total quantity of supported rank indicator combinations;

$\lceil \log_2 n_{RI} \rceil_{trp1_{strp}}$ represents a bitwidth corresponding to a quantity of rank indicators allowed for STRP transmission of a first TRP, $\lceil \log_2 n_{RI} \rceil_{trp1_{jt}}$ represents a bitwidth corresponding to a quantity of rank indicators allowed for joint transmission of the first TRP, $\lceil \log_2 n_{RI} \rceil_{trpN_{strp}}$ represents a bitwidth corresponding to a quantity of rank indicators allowed for STRP transmission of an $N^{th}$ TRP, and $\lceil \log_2 n_{RI} \rceil_{trpN_{jt}}$ represents a bitwidth corresponding to a quantity of rank indicators allowed for joint transmission of the $N^{th}$ TRP; and N is greater than or equal to 2.

In an implementation of this application, in a case that the quantity of RI fields is X+1 or X+2, and X>1, each of the X RI fields corresponds to one STRP measurement hypothesis, and a bitwidth of each of the X RI fields is determined based on one or more of the following:

(1) a quantity of antenna ports, for example, one antenna port, two antenna ports, four antenna ports, or more than four antenna ports; and (2) a bitwidth corresponding to a quantity of rank indicators allowed for STRP transmission.

In an implementation of this application, in a case that the quantity of RI fields is 2, a first RI field corresponds to the X STRP measurement hypotheses, a second RI field corresponds to the one joint transmission measurement hypothesis, and a bitwidth of the first RI field is determined based on one or more of the following:

(1) a quantity of antenna ports of each TRP, for example, one antenna port, two antenna ports, four antenna ports, or more than four antenna ports;

(2) a bitwidth corresponding to the number of rank indicators allowed for transmission of each TRP, or a bitwidth corresponding to a sum of quantities of rank indicators allowed for transmission of all TRPs; and (3) a value of X.

In an implementation of this application, the method further includes:

receiving higher layer signaling, where the higher layer signaling is used to limit the first field in the CSI report, and the higher layer signaling is in a one-to-correspondence with a TRP, or there is a mapping relationship between the higher layer signaling and a CMR or a CMR group.

For example, the higher layer signaling may be typeI-SinglePanel-ri-Restriction, ri-Restriction, typeII-RI-Restriction, typeII-PortSelectionRI-Restriction, typeII-RI-Restriction-r16, or typeII-PortSelectionRI-Restriction-r16.

In an implementation of this application, a manner of mapping the STRP measurement hypothesis to the CSI report includes:

a precoding matrix indicator (PMI) granularity and a channel quality indicator (CQI) granularity in the CSI report are wideband, and mapping content of the STRP measurement hypothesis in the CSI report includes one or more of the following: a CRI, a newly defined indicator, an RI, a layer indicator (LI), a PMI, and a CQI.

For example, if the STRP measurement hypothesis is selected for reporting, and the PMI granularity and the CQI granularity are wideband, the mapping content includes: (i) a first CRI, a first NCJT indicator, a first RI, a first LI, a first PMI, and a first CQI; or (ii) a first CRI, a first RI, a first LI, a first PMI, and a first CQI.

Alternatively, a manner of mapping the joint transmission measurement hypothesis to the CSI report includes:

a PMI granularity and a CQI granularity in the CSI report are wideband, and mapping content of the joint transmission measurement hypothesis in the CSI report includes one or more of the following: one or more CRIs, a newly defined indicator field, one or more RIs, one or more LIs, one or more PMIs, and one or more CQIs.

For example, if the NCJT measurement hypothesis is selected for reporting, and the PMI granularity and the CQI granularity are wideband, the mapping content includes: (i) a first CRI, a first NCJT indicator, a first RI, a second RI, a first LI, a second LI, a first PMI, a second PMI, a first CQI, and a second CQI; or (ii) a first CRI, a second CRI, a first RI, a second RI, a first LI, a second LI, a first PMI, a second PMI, a first CQI, and a second CQI; or (iii) an NCJT CRI, a first RI, a second RI, a first LI, a second LI, a first PMI, a second PMI, a first CQI, and a second CQI.

Alternatively, a manner of mapping the joint transmission measurement hypothesis to the CSI report includes:

a PMI granularity and a CQI granularity in the CSI report are wideband, and mapping content of the joint transmission measurement hypothesis in the CSI report includes a first part (part 1) and a second part (part 2), where the first part includes one or more of the following: one CRI, a newly defined indicator, a plurality of RIs, one LI, one PMI, and one CQI; and the second part includes one or more of the following: one LI, one PMI, and one CQI;

or the first part includes one or more of the following: a plurality of CRIs, a plurality of RIs, one LI, one PMI, and one CQI; and the second part includes one or more of the following: one LI, one PMI, and one CQI;

or the first part includes one or more of the following: one CRI, a plurality of RIs, one LI, one PMI, and one CQI; and the second part includes one or more of the following: one LI, one PMI, and one CQI.

For example, if the NCJT measurement hypothesis is selected for reporting, and the PMI granularity and the CQI granularity are wideband, the CSI report is divided into two parts (part 1 and part 2), where (i) part 1 mapping content includes a first CRI, a first NCJT indicator, a first RI, a second RI, a first LI, a first PMI, and a first CQI; and part 2 mapping content includes a second LI, a second PMI, and a second CQI; or (ii) part 1 mapping content includes a first CRI, a second CRI, a first RI, a second RI, a first LI, a first PMI, and a first CQI; and part 2 mapping content includes a second LI, a second PMI, and a second CQI; or (iii) part 1 mapping content includes an NCJT CRI, a first RI, a second RI, a first LI, a first PMI, and a first CQI; and part 2 mapping content includes a second LI, a second PMI, and a second CQI.

Alternatively, a manner of mapping the STRP measurement hypothesis to the CSI report includes:

a PMI granularity and a CQI granularity in the CSI report are subband, and mapping content of the STRP measurement hypothesis in the CSI report includes a first part, a second part and a third part, where the first part includes one or more of the following: one CRI, one newly defined indicator, one RI, a wideband channel quality indicator for first transport block (wideband CQI for first TB), a subband channel quality indicator for first transport block (subband CQI for first TB), and one non-zero wideband amplitude coefficient; the second part includes one or more of the following: a wideband channel quality indicator for second transport block (wideband CQI for second TB), one LI, and one wideband precoding matrix indicator (wideband PMI); and the third part includes one or more of the following: an even subband channel quality indicator for second transport block (even subband CQI for second TB), an even subband precoding matrix indicator (even subband PMI), an odd subband channel quality indicator for second transport block (odd subband CQI for second TB), and an odd subband precoding matrix indicator (odd subband PMI);

or the first part includes one or more of the following: one CRI, one RI, a wideband channel quality indicator for first transport block (wideband CQI for first TB), a subband channel quality indicator for first transport block (subband CQI for first TB), and a non-zero wideband amplitude coefficient; the second part includes one or more of the following: a wideband channel quality indicator for second transport block (wideband CQI for second TB), one LI, and one wideband precoding matrix indicator (wideband PMI); and the third part includes one or more of the following: an even subband channel quality indicator for second transport block (even subband CQI for second TB), an even subband precoding matrix indicator (even subband PMI), an odd subband channel quality indicator for second transport block (odd subband CQI for second TB), and an odd subband precoding matrix indicator (odd subband PMI).

For example, if the STRP measurement hypothesis is selected for reporting, and the PMI granularity and the CQI granularity are subband, the CSI report is divided into two parts (part 1, part 2 wideband, and part 2 subband), where (i) part 1 mapping content includes a first CRI, a first NCJT indicator, a first RI, a first wideband CQI for first TB, a first subband CQI for first TB, and a first non-zero wideband amplitude coefficient; part 2 wideband mapping content includes a first wideband CQI for second TB, a first LI, and a first wideband PMI; and part 2 subband mapping content includes a first even subband CQI for second TB, a first even subband PMI, a first odd subband CQI for second TB, and a first odd subband PMI; or (ii) part 1 mapping content includes a first CRI, a first RI, a first wideband CQI for first TB, a first subband CQI for first TB, and a first non-zero wideband amplitude coefficient; part 2 wideband mapping content includes a first wideband CQI for second TB, a first LI, and a first wideband PMI; and part 2 subband mapping content includes a first even subband CQI for second TB, a first even subband PMI, a first odd subband CQI for second TB, and a first odd subband PMI.

Alternatively, a manner of mapping the joint transmission measurement hypothesis to the CSI report includes:

a PMI granularity and a CQI granularity in the CSI report are subband, and mapping content of the NCJT measurement hypothesis in the CSI report includes a first part, a second part and a third part, where the first part includes one or more of the following: one CRI, a newly defined indicator, one or more RIs, a wideband channel quality indicator for first transport block (wideband CQI for first TB), a subband channel quality indicator for first transport block (subband CQI for first TB), and one or more non-zero wideband amplitude coefficients; the second part includes one or more of the following: a wideband channel quality indicator for second transport block (wideband CQI for second TB), one or more LIs, one or more wideband precoding matrix indicators (wideband PMI), and wideband channel quality indicators for a plurality of transport blocks; and the third part includes one or more of the following: an even subband channel quality indicator for second transport block, a plurality of even subband precoding matrix indicators, a plurality of second even subband channel quality indicators for transport blocks, a plurality of second odd subband channel quality indicators for transport blocks, a plurality of odd subband precoding matrix indicators, an odd subband channel quality indicator for first transport block, and an odd subband channel quality indicator for second transport block;

or the first part includes one or more of the following: one or more CRIs, one or more RI fields, a wideband channel quality indicator for first transport block, a subband channel quality indicator for first transport block, and one or more non-zero wideband amplitude coefficients; the second part includes one or more of the following: a wideband channel quality indicator for second transport block, one or more LIs, a plurality of wideband precoding matrix indicators, a wideband channel quality indicator for first transport block, and a wideband channel quality indicator for second transport block; and the third part includes one or more of the following: an even subband channel quality indicator for second transport block, a plurality of even subband precoding matrix indicators, an even subband channel quality indicator for first transport block, an even subband channel quality indicator for second transport block, one even subband precoding matrix indicator, an odd subband channel quality indicator for second transport block, a plurality of odd subband precoding matrix indicators, and odd subband channel quality indicators for a plurality of transport blocks;

or the first part includes one or more of the following: a CRI, one or more RIs, a wideband channel quality indicator for first transport block, a subband channel quality indicator for first transport block, and one or more non-zero wideband amplitude coefficients; the second part includes one or more of the following: wideband channel quality indicators for a plurality of second transport blocks, one or more LIs, one or more wideband precoding matrix indicators, a wideband channel quality indicator for first transport block, and a wideband channel quality indicator for second transport block; and the third part includes one or more of the following: an even subband channel quality indicator for second transport block, one or more even wideband precoding matrix indicators, a subband channel quality indicator for first transport block, a subband channel quality indicator for second transport block, a plurality of second odd subband channel quality indicators for transport blocks, one or more odd wideband precoding matrix indicators, and an odd subband channel quality indicator for first transport block.

For example, if the NCJT measurement hypothesis is selected for reporting, and the PMI granularity and the CQI granularity are subband, the CSI report is divided into two parts (part 1, part 2 wideband, and part 2 subband), where (i) part 1 mapping content includes a first CRI, a first NCJT indicator, a first RI, a second RI, a first wideband CQI for first TB, a first subband CQI for first TB, a first non-zero wideband amplitude coefficient, and a second non-zero wideband amplitude coefficient; part 2 wideband mapping content includes a first wideband CQI for second TB, a first LI, a first wideband PMI, a second wideband CQI for first TB, a second wideband CQI for second TB, a second LI, and a second wideband PMI; and part 2 subband mapping content includes a first even subband CQI for second TB, a first even subband PMI, a second even subband CQI for first TB, a second even subband CQI for second TB, a second even subband PMI, a first odd subband CQI for second TB, a first odd subband PMI, a second odd subband CQI for first TB, a second odd subband CQI for second TB, and a second odd subband PMI;

(ii) part 1 mapping content includes a first CRI, a second CRI, a first RI, a second RI, a first wideband CQI for first TB, a first subband CQI for first TB, a first non-zero wideband amplitude coefficient, and a second non-zero wideband amplitude coefficient; part 2 wideband mapping content includes a first wideband CQI for second TB, a first LI, a first wideband PMI, a second wideband CQI for first TB, a second wideband CQI for second TB, a second LI, and a second wideband PMI; and part 2 subband mapping content includes a first even subband CQI for second TB, a first even subband PMI, a second even subband CQI for first TB, a second even subband CQI for second TB, a second even subband PMI, a first odd subband CQI for second TB, a first odd subband PMI, a second odd subband CQI for first TB, a second odd subband CQI for second TB, and a second odd subband PMI; or (iii) part 1 mapping content includes an NCJT CRI, a first RI, a second RI, a first wideband CQI for first TB, a first subband CQI for first TB, a first non-zero wideband amplitude coefficient, and a second non-zero wideband amplitude coefficient; part 2 wideband mapping content includes a first wideband CQI for second TB, a first LI, a first wideband PMI, a second wideband CQI for first TB, a second wideband CQI for second TB, a second LI, and a second wideband PMI; and part 2 subband mapping content includes a first even subband CQI for second TB, a first even subband PMI, a second even subband CQI for first TB, a second even subband CQI for second TB, a second even subband PMI, a first odd subband CQI for second TB, a first odd subband PMI, a second odd subband CQI for first TB, a second odd subband CQI for second TB, and a second odd subband PMI.

In an implementation of this application, the CSI report includes one or more of the following:

(1) mapping content of at least some joint transmission measurement hypotheses; and (2) mapping content of at least some STRP measurement hypotheses.

For example, when the UE selects, from all the STRP and NCJT measurement hypotheses, one STRP measurement hypothesis and one NCJT measurement hypothesis for reporting, the CSI report mapping method may include:

(a) combining the foregoing STRP mapping content and NCJT content, for example, combining one STRP CSI and one NCJT CSI into a new CSI report;

(b) combining the foregoing STRP mapping content and NCJT content, for example, combining one STRP part 1 and one NCJT part 1 into a new part 1, and combining one STRP part 2 and one NCJT part 2 into a new part 2;

(c) combining the foregoing STRP mapping content and NCJT content, for example, combining one STRP part 1 (including only a CRI, an RI, and a non-zero wideband amplitude coefficient) and one NCJT part 1 into a new part 1, and combining one STRP part 2 (including only a remaining part) and one NCJT part 2 into a new part 2;

(d) combining the foregoing STRP mapping content and NCJT content, for example, combining one STRP part 1 (including only an RI and a non-zero wideband amplitude coefficient) and one NCJT part 1 into a new part 1, and combining one STRP part 2 (including only a remaining part) and one NCJT part 2 into a new part 2;

(e) combining the foregoing STRP mapping content and NCJT content, for example, combining one STRP part 1 and one NCJT part 1 (including only a CRI, an RI, and a non-zero wideband amplitude coefficient) into a new part 1, and combining one STRP part 2 and one NCJT part 2 (including only a remaining part) into a new part 2; or (f) combining the foregoing STRP mapping content and NCJT content, for example, combining one STRP part 1 and one NCJT part 1 (including only an RI and a non-zero wideband amplitude coefficient) into a new part 1, and combining one STRP part 2 and one NCJT part 2 (including only a remaining part) into a new part 2.

For example, when the UE selects, from all the STRP and NCJT measurement hypotheses, two STRP measurement hypotheses and one NCJT measurement hypothesis for reporting, the CSI report mapping method may include:

(a) combining the foregoing STRP mapping content and NCJT content, for example, combining two STRP CSIs and one NCJT CSI into a new CSI report;

(b) combining the foregoing STRP mapping content and NCJT content, for example, combining two STRP parts 1 and one NCJT part 1 into a new part 1, and combining two STRP parts 2 and one NCJT part 2 into a new part 2;

(c) combining the foregoing STRP mapping content and NCJT content, for example, combining two STRP parts 1 (including only a CRI, an RI, and a non-zero wideband amplitude coefficient) and one NCJT part 1 into a new part 1, and combining two STRP parts 2 (including only a remaining part) and one NCJT part 2 into a new part 2;

(d) combining the foregoing STRP mapping content and NCJT content, for example, combining two STRP parts 1 (including only an RI and and a non-zero wideband amplitude coefficient) and one NCJT part 1 into a new part 1, and combining two STRP parts 2 (including only a remaining part) and one NCJT part 2 into a new part 2;

(e) combining the foregoing STRP mapping content and NCJT content, for example, combining two STRP parts 1 and one NCJT part 1 (including only a CRI, an RI, and a non-zero wideband amplitude coefficient) into a new part 1, and combining two STRP parts 2 and one NCJT part 2 (including only a remaining part) into a new part 2; or (f) combining the foregoing STRP mapping content and NCJT content, for example, combining two STRP parts 1 and one NCJT part 1 (including only an RI and a non-zero wideband amplitude coefficient) into a new part 1, and combining two STRP parts 2 and one NCJT part 2 (including only a remaining part) into a new part 2.

Example 1: If the PMI granularity and the CQI granularity are wideband, the mapping content includes:

(i) a first CRI, a second CRI, a first RI, a second RI, a third RI, a first LI, a second LI, a third LI, a first PMI, a second PMI, a third PMI, a first CQI, a second CQI, and a third CQI; or (ii) a first CRI, a second CRI, a third CRI, a first RI, a second RI, a third RI, a first LI, a second LI, a third LI, a first PMI, a second PMI, a third PMI, a first CQI, a second CQI, and a third CQI.

Example 2: If the PMI granularity and the CQI granularity are wideband, the CSI report is divided into two parts (part 1 and part 2), and part 1 mapping content and part 2 mapping content are as follows:

(i) The part 1 mapping content includes a first CRI, a first RI, a second RI, a third RI, a first LI, a first PMI, and a first CQI; and the part 2 mapping content includes a second LI, a second PMI, a second CQI, a third CRI, a third LI, a third PMI, and a third CQI;

(ii) the part 1 mapping content includes a first CRI, a second CRI, a first RI, a second RI, a third RI, a first LI, a first PMI, and a first CQI; and the part 2 mapping content includes a second LI, a second PMI, a second CQI, a third CRI, a third LI, a third PMI, and a third CQI;

(iii) the part 1 mapping content includes a first CRI, a third CRI, a first RI, a second RI, a third RI, a first LI, a third LI, a first PMI, a third PMI, a first CQI, and a third CQI; and the part 2 mapping content includes a second LI, a second PMI, and a second CQI; or (iv) the part 1 mapping content includes a first CRI, a second CRI, a third CRI, a first RI, a second RI, a third RI, a first LI, a third LI, a first PMI, a third PMI, a first CQI, and a third CQI; and the part 2 mapping content includes a second LI, a second PMI, and a second CQI.

For example, if the PMI granularity and the CQI granularity are subband, the CSI report is divided into two parts (part 1, part 2 wideband, and part 2 subband), and part 1 mapping content and part 2 mapping content are as follows:

(i) The part 1 mapping content includes a first CRI, a first RI, a second RI, a third RI, a first wideband CQI for first TB, a first subband CQI for first TB, a first non-zero wideband amplitude coefficient, a third non-zero wideband amplitude coefficient, and a third non-zero wideband amplitude coefficient; the part 2 wideband mapping content includes a first wideband CQI for second TB, a first LI, a first wideband PMI, a second wideband CQI for first TB, a second wideband CQI for second TB, a second LI, a second wideband PMI, a third wideband CQI for first TB, a third wideband CQI for second TB, a third LI, and a third wideband PMI; and the part 2 subband mapping content includes a first even subband CQI for second TB, a first even subband PMI, a second even subband CQI for first TB, a second even subband CQI for second TB, a second even subband PMI, a third even subband CQI for first TB, a third even subband CQI for second TB, a third even subband PMI, a first odd subband CQI for second TB, a first odd subband PMI, a second odd subband CQI for first TB, a second odd subband CQI for second TB, a second odd subband PMI, a third odd subband CQI for first TB, a third odd subband CQI for second TB, and a third odd subband PMI;

(ii) the part 1 mapping content includes a first CRI, a second CRI, a first RI, a second RI, a third RI, a first wideband CQI for first TB, a first subband CQI for first TB, a first non-zero wideband amplitude coefficient, a third non-zero wideband amplitude coefficient, and a third non-zero wideband amplitude coefficient; the part 2 wideband mapping content includes: a first wideband CQI for second TB, a first LI, a first wideband PMI, a second wideband CQI for first TB, a second wideband CQI for second TB, a second LI, a second wideband PMI, a third wideband CQI for first TB, a third wideband CQI for second TB, a third LI, and a third wideband PMI; and the part 2 subband mapping content includes a first even subband CQI for second TB, a first even subband PMI, a second even subband CQI for first TB, a second even subband CQI for second TB, a second even subband PMI, a third even subband CQI for first TB, a third even subband CQI for second TB, a third even subband PMI, a first odd subband CQI for second TB, a first odd subband PMI, a second odd subband CQI for first TB, a second odd subband CQI for second TB, a second odd subband PMI, a third odd subband CQI for first TB, a third odd subband CQI for second TB, and a third odd subband PMI;

(iii) the part 1 mapping content includes a first CRI, a third CRI, a first RI, a second RI, a third RI, a first wideband CQI for first TB, a first subband CQI for first TB, a third wideband CQI for first TB, a third subband CQI for first TB, a first non-zero wideband amplitude coefficient, a third non-zero wideband amplitude coefficient, and a third non-zero wideband amplitude coefficient; the part 2 wideband mapping content includes a first wideband CQI for second TB, a first LI, a first wideband PMI, a second wideband CQI for first TB, a second wideband CQI for second TB, a second LI, a second wideband PMI, a third wideband CQI for second TB, a third LI, and a third wideband PMI; and the part 2 subband mapping content includes a first even subband CQI for second TB, a first even subband PMI, a second even subband CQI for first TB, a second even subband CQI for second TB, a second even subband PMI, a third even subband CQI for second TB, a third even subband PMI, a first odd subband CQI for second TB, a first odd subband PMI, a second odd subband CQI for first TB, a second odd subband CQI for second TB, a second odd subband PMI, a third odd subband CQI for second TB, and a third odd subband PMI; or (iv) the part 1 mapping content includes a first CRI, a second CRI, a third CRI, a first RI, a second RI, a third RI, a first wideband CQI for first TB, a first subband CQI for first TB, a third wideband CQI for first TB, a third subband CQI for first TB, a first non-zero wideband amplitude coefficient, a third non-zero wideband amplitude coefficient, and a third non-zero wideband amplitude coefficient; the part 2 wideband mapping content includes a first wideband CQI for second TB, a first LI, a first wideband PMI, a second wideband CQI for first TB, a second wideband CQI for second TB, a second LI, a second wideband PMI, a third wideband CQI for second TB, a third LI, and a third wideband PMI; and the part 2 subband mapping content includes a first even subband CQI for second TB, a first even subband PMI, a second even subband CQI for first TB, a second even subband CQI for second TB, a second even subband PMI, a third even subband CQI for second TB, a third even subband PMI, a first odd subband CQI for second TB, a first odd subband PMI, a second odd subband CQI for first TB, a second odd subband CQI for second TB, a second odd subband PMI, a third odd subband CQI for second TB, and a third odd subband PMI.

In an implementation of this application, the method further includes:

when the plurality of CSI reports include multi-TPR (MTRP) CSI reports, the terminal determines one or more of a transmission priority of a CSI report in the plurality of CSI reports and a transmission priority of CSI content in the MTRP CSI reports, where the CSI content in the MTRP CSI reports includes one or more of the following: CSI content corresponding to the joint transmission measurement hypothesis, CSI content corresponding to the STRP measurement hypothesis, wideband information of the joint transmission measurement hypothesis, wideband information of the STRP measurement hypothesis, subband information of the joint transmission measurement hypothesis, and subband information of the STRP measurement hypothesis.

For example, (1) when the PMI granularity and the CQI granularity are subband, a priority of part 1 is higher than a priority of part 2 wideband, and the priority of part 2 wideband is higher than a priority of part 2 subband; or (2) when the PMI granularity and the CQI granularity are subband, a priority of part 1 is higher than a priority of part 2 wideband, a priority of a part 2 NCJT measurement hypothesis is higher than a priority of a part 2 STRP measurement hypothesis, and a priority of a part 2 wideband field is higher than a priority of a part 2 subband field.

For example, when a CSI feedback is based on a physical uplink control channel (Physical Uplink Control Channel, PUCCH) or a physical uplink shared channel (Physical Uplink Shared Channel, PUSCH), if there is an MTRP CSI report in the plurality of CSI reports that are fed back, it is necessary to determine priorities of the plurality of CSI reports, and a priority of content included in the MTRP CSI report.

In an implementation of this application, a transmission priority of each CSI report in the plurality of CSI reports includes one or more of the following:

(1) for a plurality of aperiodic CSI reports reported based on a PUSCH, all of which do not carry layer 1 reference signal received powers (L1-RSRP) or layer 1 signal to interference plus noise ratios (L1-SINR), a priority of an MTRP CSI report is higher than a priority of a non-MTRP CSI report;

(2) for a plurality of semi-persistent CSI reports reported based on a PUSCH, all of which do not carry L1-RSRPs or L1-SINRs, a priority of an MTRP CSI report is higher than a priority of a non-MTRP CSI report;

(3) for a plurality of semi-persistent CSI reports reported based on a PUCCH, all of which do not carry L1-RSRPs or L1-SINRs, a priority of an MTRP CSI report is higher than a priority of a non-MTRP CSI report; and (4) for a plurality of periodic CSI reports reported based on a PUCCH, all of which do not carry L1-RSRPs or L1-SINRs, a priority of an MTRP CSI report is higher than a priority of a non-MTRP CSI report.

In other words, for the plurality of aperiodic CSI reports reported based on the PUSCH, or the plurality of semi-persistent CSI reports reported based on the PUSCH, or the plurality of semi-persistent CSI reports reported based on the PUCCH, or the plurality of periodic CSI reports reported based on the PUCCH, all of which do not carry L1-RSRPs or L1-SINRs, and the priority of the MTRP CSI report is higher than the priority of the non-MTRP CSI report, or conversely.

For example, the priority of the MTRP CSI report is higher than the priority of the non-MTRP CSI report, and a corresponding calculation formula may be: $Pri_{iCSI}(y,k,m,c,s)=2\cdot N_{cells}\cdot M_s\cdot y+N_{cells}\cdot M_s\cdot k+N_{cells}\cdot M_s\cdot m/2+Ms\cdot c+s$, where m=0 indicates that the report carries an MTRP CSI report, and m=1 indicates that the report carries an STRP CSI report.

In an implementation of this application, the transmission priority of the CSI content in the MTRP CSI reports includes one or more of the following:

a transmission priority of the joint transmission measurement hypothesis is higher than a transmission priority of the STRP measurement hypothesis; and transmission priorities of the wideband information of the joint transmission measurement hypothesis and the wideband information of the STRP measurement hypothesis are higher than transmission priorities of the subband information of the joint transmission measurement hypothesis and the subband information of the STRP measurement hypothesis.

In an implementation of this application, when only one CRI is reported in the joint transmission measurement hypothesis and a plurality of RIs, PMIs, and LIs are included, the mapping sequence needs to match the CRI or a CMR sequence indicated by the CRI.

(a) For example, if CRI0 is defined as CMR1 and CMR2 (a pair of CMRs associated with the joint transmission measurement hypothesis), the mapping sequence is to first map an RI, a PMI, and an LI related to CMR1, and then map an RI, a PMI, and an LI related to CMR2.

(b) For example, if CRI0 is defined as CMR1 in CMR1 and CMR2 (a pair of CMRs associated with the joint transmission measurement hypothesis), the mapping sequence is to first map an RI, a PMI, and an LI related to CMR1, and then map an RI, a PMI, and an LI related to CMR2.

In this embodiment of this application, the terminal can report content of one or more measurement hypotheses in a plurality of types of measurement hypotheses to the network-side device by using the first field in the CSI report, thereby reducing CSI report feedback overheads and better supporting MTRP transmission.

Figure 3:
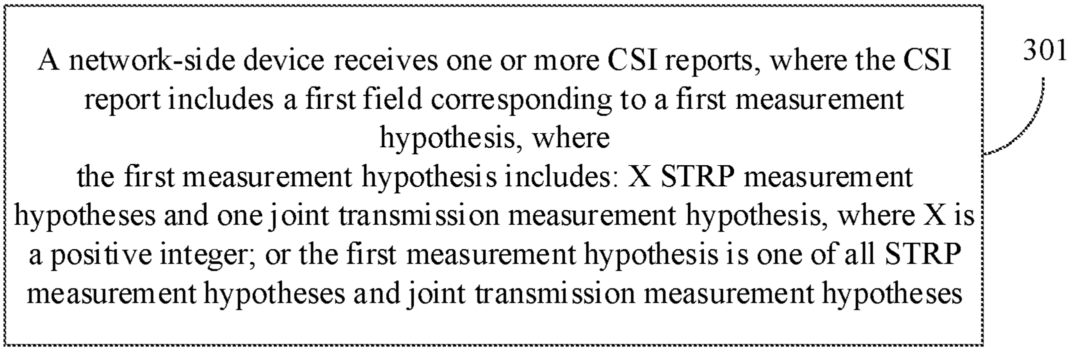
FIG. 3 is a second flowchart of a CSI feedback method according to an embodiment of this application.

Referring to FIG. 3, an embodiment of this application provides a CSI feedback method. A specific procedure includes step 301.

Step 301: A network-side device receives one or more CSI reports, where the CSI report includes a first field corresponding to a first measurement hypothesis, where the first measurement hypothesis includes: X STRP measurement hypotheses and one joint transmission measurement hypothesis, where X is a positive integer; or the first measurement hypothesis is one of all STRP measurement hypotheses and joint transmission measurement hypotheses.

It may be understood that, for the description about the first field and the first hypothesis in the embodiment shown in FIG. 3, reference may be made to the embodiment shown in FIG. 2. Details are not described herein again.

In an implementation of this application, in a case that the first field is an RI field and that the first measurement hypothesis is one of all the STRP measurement hypotheses and joint transmission measurement hypotheses, a bitwidth of the RI field (field) is determined based on one or more of the following:

(1) a quantity of antenna ports, for example, one antenna port, two antenna ports, four antenna ports, or more than four antenna ports;

(2) a bitwidth length (bitwidth) corresponding to a quantity of rank indicators allowed for STRP transmission;

(3) a bitwidth corresponding to a quantity of rank indicators allowed for joint transmission; and (4) a total quantity of rank indicators or rank indicator combinations supported by the terminal.

In an implementation of this application, the bitwidth of the RI field is one of the following:

(1) A first value, where the first value includes 0 or min(1, max($\lceil \log_2 n_{RI} \rceil_{trp1_{strp}}$, . . . , $\lceil \log_2 n_{RI} \rceil_{trpN_{strp}}$, $\lceil \log_2 n_{RI} \rceil_{trp1_{jt}}$+ . . . +$\lceil \log_2 n_{RI} \rceil_{trpN_{jt}}$)), or min(2, max ($\lceil \log_2 n_{RI} \rceil_{trp1_{strp}}$, . . . , $\lceil \log_2 n_{RI} \rceil_{trpN_{strp}}$, $\lceil \log_2 n_{RI} \rceil_{trp1_{jt}}$+ $\lceil \log_2 n_{RI} \rceil_{trpN_{jt}}$)), or min(3, max($\lceil \log_2 n_{RI} \rceil_{trp1_{strp}}$, . . . , $\lceil \log_2 n_{RI} \rceil_{trpN_{strp}}$, $\lceil \log_2 n_{RI} \rceil_{trp1_{jt}}$+ . . . +$\lceil \log_2 n_{RI} \rceil_{trpN_{jt}}$)), or min(4, max($\lceil \log_2 n_{RI} \rceil_{trp1_{strp}}$), . . . , $\lceil \log_2 n_{RI} \rceil_{trpN_{strp}}$, $\lceil \log_2 n_{RI} \rceil_{trp1_{jt}}$+ . . . +$\lceil \log_2 n_{RI} \lceil_{trpN_{jt}}$), or max ($\lceil \log_2 n_{RI} \rceil_{trp1_{strp}}$, . . . , $\lceil \log_2 n_{RI} \rceil_{trpN_{strp}}$, $\lceil \log_2 n_{RI} \rceil_{trp1_{jt}}$+ . . . +$\lceil \log_2 n_{RI} \rceil_{trpN_{jt}}$).

Using N=2 as an example, when each of two TRPs has only one antenna port, the bitwidth of the RI field is 0; when one TRP has only one antenna port, and the other TRP has two antenna ports, the bitwidth is: min(1, max ($\lceil \log_2 n_{RI} \rceil_{trp1_{strp}}$, $\lceil \log_2 n_{RI} \rceil_{trp2_{strp}}$, $\lceil \log_2 n_{RI} \rceil_{trp1_{jt}}$+ $\lceil \log_2 n_{RI} \rceil_{trp2_{jt}}$)); when one TRP has two antenna ports, and the other TRP has two antenna ports, the bitwidth is: min((2, max($\lceil \log_2 n_{RI} \rceil_{trp1_{strp}}$, $\lceil \log_2 n_{RI} \rceil_{trp2_{strp}}$, $\lceil \log_2 n_{RI} \rceil_{trp1_{jt}}$+ $\lceil \log_2 n_{RI} \rceil_{trp2_{jt}}$))); when one TRP has two antenna ports, and the other TRP has four antenna ports, the bitwidth is: min(3, max($\lceil \log_2 n_{RI} \rceil_{trp1_{strp}}$, $\lceil \log_2 n_{RI} \rceil_{trp2_{strp}}$, $\lceil \log_2 n_{RI} \rceil_{trp1_{jt}}$+ $\lceil \log_2 n_{RI} \rceil_{trp2_{jt}}$)); when one TRP has four antenna ports, and the other TRP has four antenna ports, the bitwidth is: min(4, max($\lceil \log_2 n_{RI} \rceil_{trp1_{strp}}$, $\lceil \log_2 n_{RI} \rceil_{trp2_{strp}}$, $\lceil \log_2 n_{RI} \rceil_{trp1_{jt}}$+ $\lceil \log_2 n_{RI} \rceil_{trp2_{jt}}$); or when each TRP has more than four antenna ports, the bitwidth is: max($\lceil \log_2 n_{RI} \rceil_{trp1_{strp}}$, $\lceil \log_2 n_{RI} \rceil_{trp2_{strp}}$, $\lceil \log_2 n_{RI} \rceil_{trp1_{jt}}$+$\lceil \log_2 n_{RI} \rceil_{trp2_{jt}}$).

(2) A second value, where the second value includes 0, or min(1, max($\lceil \log_2 n_{RI} \rceil_{trp1_{strp}}$, . . . , $\lceil \log_2 n_{RI} \rceil_{trpN_{strp}}$], $\lceil \log_2 N_{RI\_jt} \rceil$)), or min(2, max($\lceil \log_2 n_{RI} \rceil_{trp1_{strp}}$, . . . , $\lceil \log_2 n_{RI} \rceil_{trpN_{strp}}$, $\lceil \log_2 n_{RI\_jt} \rceil$), or min(3, max ($\lceil \log_2 n_{RI} \rceil_{trp1_{strp}}$, . . . , $\lceil \log_2 n_{RI} \rceil_{trpN_{strp}}$, $\lceil \log_2 N_{RI\_jt} \rceil$)), or min(4, max($\lceil \log_2 n_{RI} \rceil_{trp1_{strp}}$, . . . , $\lceil \log_2 n_{RI} \rceil_{trpN_{strp}}$, $\lceil \log_2 N_{RI\_jt} \rceil$)), or max($\lceil \log_2 n_{RI} \rceil_{trp1_{strp}}$), . . . , $\lceil \log_2 n_{RI} \rceil_{trpN_{strp}}$, $\lceil \log_2 N_{RI\_jt} \rceil$), where $N_{RI\_jt}$ represents the total quantity of supported rank indicator combinations.

(3) A third value, where the third value includes 0 or $\lceil \log_2 N_{RI} \rceil$, where $N_{RI}$ represents the total quantity of supported rank indicators or rank indicator combinations, where $\lceil \log_2 n_{RI} \rceil_{trp1_{strp}}$ represents a bitwidth corresponding to a quantity of rank indicators allowed for STRP transmission of a first TRP, $\lceil \log_2 n_{RI} \rceil_{trp1_{ncjt}}$ represents a bitwidth corresponding to a quantity of rank indicators allowed for joint transmission of the first TRP, $\lceil \log_2 n_{RI} \rceil_{trpN_{strp}}$ represents a bitwidth corresponding to a quantity of rank indicators allowed for STRP transmission of an $N^{th}$ TRP, $\lceil \log_2 n_{RI} \rceil_{trpN_{ncjt}}$ represents a bitwidth corresponding to a quantity of rank indicators allowed for joint transmission of the $N^{th}$ TRP, and Nis greater than or equal to 2.

In an implementation of this application, in a case that the bitwidth of the RI field is the first value, if the first measurement hypothesis is an STRP measurement hypothesis, one code point (codepoint) of the RI field corresponds to one rank indicator, or if the first measurement hypothesis is a joint transmission measurement hypothesis, first $\lceil \log_2 n_{RI} \rceil_{trp1_{jt}}$ bits of the RI field correspond to one rank indicator of the first TRP, and $\lceil \log_2 n_{RI} \rceil_{trpN_{jt}}$ bits after the first $\lceil \log_2 n_{RI} \rceil_{trp1_{jt}}$ bits correspond to one rank indicator of the $N^{th}$ TRP, or first $\lceil \log_2 n_{RI} \rceil_{trp1_{jt}}$ bits of the RI field correspond to one rank indicator of the first TRP, and last $\lceil \log_2 n_{RI} \rceil_{trpN_{jt}}$ bits of the RI field correspond to one rank indicator of the $N^{th}$ TRP.

In an implementation of this application, in a case that the bitwidth of the RI field is the second value, if the first measurement hypothesis is an STRP measurement hypothesis, one code point of the RI field corresponds to one rank indicator, or if the first measurement hypothesis is a joint transmission measurement hypothesis, one code point of the RI field corresponds to a group of rank indicators.

For example, a group of rank indicators is shown in Table 1. When the joint transmission measurement hypothesis is reported, if an index value indicated by the RI field is 2, it means that a group of rank indicators for JT transmission is 2 and 1.

In an implementation of this application, in a case that the bitwidth of the RI field is the third value, one code point of the RI field corresponds to one rank indicator or corresponds to a group of rank indicators.

For example, one rank indicator or a group of rank indicators is shown in Table 2. When an index value indicated by the RI field is 2, it means STRP transmission and a rank is 3. When an index value indicated by the RI field is 10, it means JT transmission, and a group of rank indicators is 2 and 1.

In an implementation of this application, in a case that the first measurement hypothesis is one of all the STRP measurement hypotheses and joint transmission measurement hypotheses, a bitwidth of a channel state information reference signal resource indicator (CSI-RS resource indicator, CRI) field in the CSI report is $\lceil \log_2(K_s+N) \rceil$, where $K_s$ represents a quantity of channel measurement resources associated with a reporting setting, and N represents a quantity of CMR pairs associated with the reporting setting.

One CMR pair is used to measure one joint transmission measurement hypothesis, that is, N may represent a quantity of joint transmission measurement hypotheses to be measured.

In an implementation of this application, the method further includes:

in a case that the first measurement hypothesis is one of all the STRP measurement hypotheses and joint transmission measurement hypotheses, the network-side device determines, based on the first field in the CSI report, that a type of the first measurement hypothesis is an STRP measurement hypothesis or a joint transmission measurement hypothesis.

The first field is one of the following:

(1) A CRI Field

For example, when $K_s$=2 and N=1, the CRI field is defined in the foregoing manner. CRI0 represents CMR1, CRI1 represents CMR2, and CRI2 represents CMR1 and CMR2. Therefore, CRI2 reported by a user represents a joint transmission measurement hypothesis.

(2) an RI Field

The RI field is defined in the foregoing manner.

Alternatively, an RI combination in another manner is used for indication. For example, when $K_s=2$ and N=1, the user reports RI1=0 and RI2=1, where only RI2 is a valid value. In this case, the user reports an STRP measurement hypothesis, which corresponds to a TRP corresponding to RI2. If the user reports RI1=1 and RI2=1, both of which are valid values, the user reports a joint transmission measurement hypothesis.

The valid value may be determined based on an RI limitation, a quantity of ports, or an RI combination supported for joint transmission.

(3) A Newly Defined Indicator Field

For example, the newly defined indicator field is a joint transmission indicator field (JT Indicator field). When $K_s=2$ and N=1, the CRI field is defined as CRI0 to represent CMR1 or CRI1 to represent CMR2. Therefore, when the user reports CRI0 and an STRP transmission hypothesis, the joint transmission indicator field is 0; or when the user reports CRI0 and a joint transmission hypothesis, the joint transmission indicator field is 1.

In an implementation of this application, in a case that the first measurement hypothesis includes the X STRP measurement hypotheses and the one joint transmission measurement hypothesis, a quantity of RI fields in the CSI report is:

(1) X+1, where X RI fields correspond to the X STRP measurement hypotheses, and one RI field corresponds to the one joint transmission measurement hypothesis;

(2) X+2, where X RI fields correspond to the X STRP measurement hypotheses, and two RI fields correspond to the one joint transmission measurement hypothesis;

(3) 1, where one RI field corresponds to the X STRP measurement hypotheses and the one joint transmission measurement hypothesis; or (4) 2, where one RI field corresponds to the X STRP measurement hypotheses, and one RI field corresponds to the one joint transmission measurement hypothesis.

In an implementation of this application, in a case that the quantity of RI fields is X+1 or X+2, a sequence of mapping the joint transmission measurement hypothesis and STRP measurement hypotheses to the RI fields includes: the joint transmission measurement hypothesis takes precedence over the STRP measurement hypotheses, or the STRP measurement hypotheses take precedence over the joint transmission measurement hypothesis.

In an implementation of this application, in a case that the quantity of RI fields is X+1, a first RI field corresponds to the one joint transmission measurement hypothesis, and a bitwidth of the first RI field is determined based on one or more of the following:

(1) a quantity of antenna ports, for example, one antenna port, two antenna ports, four antenna ports, or more than four antenna ports;

(2) a bitwidth corresponding to a quantity of rank indicators allowed for joint transmission; and (3) a total quantity of rank indicators supported by the terminal; and (4) a total quantity of rank indicator combinations supported by the terminal.

The total quantity of rank indicators supported by the terminal may be understood as the quantity of rank indicators supported by the terminal for joint transmission. The total quantity of rank indicator combinations supported by the terminal may be understood as the quantity of rank indicator combinations supported by the terminal for joint transmission. Support may also be understood as permission.

In an implementation of this application, the bitwidth of the first RI field is one of the following:

(1) a fourth value, where the fourth value includes 0, or $\min(1, \lceil\log_2 n_{RI}\rceil_{trp1_{jt}} + \ldots + \lceil\log_2 n_{RI}\rceil_{trpN_{jt}})$, or $\min(2, \lceil\log_2 n_{RI}\rceil_{trp1_{jt}} + \ldots + \lceil\log_2 n_{RI}\rceil_{trpN_{jt}})$, or $\min(3, \lceil\log_2 n_{RI}\rceil_{trp1_{jt}} + \ldots + \lceil\log_2 n_{RI}\rceil_{trpN_{jt}})$, or $\min(4, \lceil\log_2 n_{RI}\rceil_{trp1_{jt}} + \ldots + \lceil\log_2 n_{RI}\rceil_{trpN_{jt}})$, or $\lceil\log_2 n_{RI}\rceil_{trp1_{jt}} + \ldots + \lceil\log_2 n_{RI}\rceil_{trpN_{jt}}$, where $\lceil\log_2 n_{RI}\rceil_{trp1_{jt}}$ represents a bitwidth corresponding to a quantity of rank indicators allowed for joint transmission of a first TRP, and $\lceil\log_2 n_{RI}\rceil_{trpN_{jt}}$ represents a bitwidth corresponding to a quantity of rank indicators allowed for joint transmission of an $N^{th}$ TRP; and (2) a fifth value, where the fifth value includes 0, or $\min(1, \lceil\log_2 N_{RI\_jt}\rceil)$, or $\min(2, \lceil\log_2 N_{RI\_jt}\rceil)$, or $\min(3, \lceil\log_2 N_{RI\_jt}\rceil)$, or $\min(4, \lceil\log_2 N_{RI\_jt}\rceil)$, or $\lceil\log_2 N_{RI\_jt}\rceil$, where $N_{RI\_jt}$ represents the total quantity of supported rank indicator combinations.

In an implementation of this application, in a case that the bitwidth of the first RI field is the fourth value, (1) first $\lceil\log_2 n_{RI}\rceil_{trp1_{jt}}$ bits of the first RI field correspond to one rank indicator of the first TRP, and $\lceil\log_2 n_{RI}\rceil_{trp2_{jt}}$ bits after the first $\lceil\log_2 n_{RI}\rceil_{trp1_{jt}}$ bits correspond to one rank indicator of the $N^{th}$ TRP; or (2) first $\lceil\log_2 n_{RI}\rceil_{trp1_{jt}}$ bits of the first RI field correspond to one rank indicator of the first TRP, and last $\lceil\log_2 n_{RI}\rceil_{trp2_{jt}}$ bits of the first RI field correspond to one rank indicator of a second TRP; or (3) in a case that the bitwidth of the first RI field is the fifth value, one code point (codepoint) of the first RI field corresponds to a group of rank indicators, where N is greater than or equal to 2.

For example, a group of rank indicators is shown in Table 3. When the NCJT measurement hypothesis is reported, if an index value indicated by the RI field is 2, it means that a group of rank indicators for NCJT transmission is 2 and 1.

In an implementation of this application, in a case that the quantity of RI fields is X+1 or X+2, and X=1, a second RI field corresponds to one STRP measurement hypothesis, and a bitwidth of the second RI field is determined based on one or more of the following:

(1) a quantity of antenna ports, for example, one antenna port, two antenna ports, four antenna ports, or more than four antenna ports;

(2) a bitwidth corresponding to a quantity of rank indicators allowed for STRP transmission.

In an implementation of this application, the bitwidth of the second RI field is a sixth value; and the sixth value include 0, or $\min(1, \max(\lceil\log_2 n_{RI}\rceil_{trp1_{strp}}, \ldots, \lceil\log_2 n_{RI}\rceil_{trpN_{strp}}))$, or $\min(2, \max(\lceil\log_2 n_{RI}\rceil_{trp1_{strp}}, \ldots, \lceil\log_2 n_{RI}\rceil_{trpN_{strp}}))$, or $\min(3, \max(\lceil\log_2 n_{RI}\rceil_{trp1_{strp}}, \ldots, \lceil\log_2 n_{RI}\rceil_{trpN_{strp}})$, or $\min(4, \max(\lceil\log_2 n_{RI}\rceil_{trp1_{strp}}, \lceil\log_2 n_{RI}\rceil_{trpN_{strp}})))$, or $\max(\lceil\log_2 n_{RI}\rceil_{trp1_{strp}}, \ldots, \lceil\log_2 n_{RI}\rceil_{trpN_{strp}})$, where $\lceil\log_2 n_{RI}\rceil_{trp1_{strp}}$ represents a bitwidth corresponding to a quantity of rank indicators allowed for STRP transmission of a first TRP, and $\lceil\log_2 n_{RI}\rceil_{trpN_{strp}}$ represents a bitwidth corresponding to a quantity of rank indicators allowed for STRP transmission of an $N^{th}$ TRP; and N is greater than or equal to 2.

In an implementation of this application, in a case that there is only one RI field, a bitwidth of the RI field is determined based on one or more of the following:

(1) a quantity of antenna ports, for example, one antenna port, two antenna ports, four antenna ports, or more than four antenna ports;

(2) a bitwidth corresponding to a quantity of rank indicators allowed for STRP transmission;

(3) a total quantity of rank indicator combinations supported by the terminal; and (4) a bitwidth corresponding to a quantity of rank indicators allowed for joint transmission.

The total quantity of rank indicator combinations supported by the terminal may be understood as the quantity of rank indicator combinations supported by the terminal for STRP transmission, and/or the quantity of rank indicator combinations supported for joint transmission. Support may also be understood as permission.

In an implementation of this application, the bitwidth of the RI field is one of the following:

(1) a seventh value, where the seventh value includes 0, or $\min(1, \lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{jt}} + \ldots + \lceil \log_2 n_{RI} \rceil_{trpN_{jt}})$, or $\min(2, \lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{jt}} + \ldots + \lceil \log_2 n_{RI} \rceil_{trpN_{jt}})$, or $\min(3, \lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{jt}} + \ldots + \lceil \log_2 n_{RI} \rceil_{trpN_{jt}})$, or $\min(4, \lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{jt}} + \ldots + \lceil \log_2 n_{RI} \rceil_{trpN_{jt}})$, or $\lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{ncjt}} + \ldots + \lceil \log_2 n_{RI} \rceil_{trpN_{jt}}$; and (2) an eighth value, where the eighth value includes 0, or $\min(1, \lceil \log_2 n_{RI} \rceil_{trp1_{strp}} + \ldots + \lceil \log_2 n_{RI} \rceil_{trpN_{strp}} + \lceil \log_2 N_{RI\_jt} \rceil)$, or $\min(2, \lceil \log_2 n_{RI} \rceil_{trp1_{strp}} + \ldots + \lceil \log_2 n_{RI} \rceil_{trpN_{strp}} + \lceil \log_2 N_{RI\_jt} \rceil)$, or $\min(3, \lceil \log_2 n_{RI} \rceil_{trp1_{strp}} + \ldots + \lceil \log_2 n_{RI} \rceil_{trpN_{strp}} + \lceil \log_2 N_{RI\_jt} \rceil)$, or $\min(4, \lceil \log_2 n_{RI} \rceil_{trp1_{strp}} + \ldots + \lceil \log_2 n_{RI} \rceil_{trpN_{strp}} + \lceil \log_2 N_{RI\_jt} \rceil)$, or $\lceil \log_2 n_{RI} \rceil_{trp1_{strp}} + \ldots + \lceil \log_2 n_{RI} \rceil_{trpN_{strp}} + \lceil \log_2 N_{RI\_jt} \rceil$, where $N_{RI\_jt}$ represents the total quantity of supported rank indicator combinations;

$\lceil \log_2 n_{RI} \rceil_{trp1_{strp}}$ represents a bitwidth corresponding to a quantity of rank indicators allowed for STRP transmission of a first TRP, $\lceil \log_2 n_{RI} \rceil_{trp1_{jt}}$ represents a bitwidth corresponding to a quantity of rank indicators allowed for joint transmission of the first TRP, $\lceil \log_2 n_{RI} \rceil_{trpN_{strp}}$ represents a bitwidth corresponding to a quantity of rank indicators allowed for STRP transmission of an $N^{th}$ TRP, and $\lceil \log_2 n_{RI} \rceil_{trpN_{jt}}$ represents a bitwidth corresponding to a quantity of rank indicators allowed for joint transmission of the $N^{th}$ TRP; and N is greater than or equal to 2.

In an implementation of this application, the method further includes:

sending higher layer signaling, where the higher layer signaling is used to limit the first field in the CSI report, and the higher layer signaling is in a one-to-correspondence with a TRP, or there is a mapping relationship between the higher layer signaling and a CMR or a CMR group.

For example, the higher layer signaling may be typeI-SinglePanel-ri-Restriction, ri-Restriction, typeII-RI-Restriction, typeII-PortSelectionRI-Restriction, typeII-RI-Restriction-r16, or typeII-PortSelectionRI-Restriction-r16.

In an implementation of this application, a manner of mapping the STRP measurement hypothesis to the CSI report includes:

a precoding matrix indicator (PMI) granularity and a channel quality indicator (CQI) granularity in the CSI report are wideband, and mapping content of the STRP measurement hypothesis in the CSI report includes one or more of the following: a CRI, a newly defined indicator, an RI, a layer indicator (LI), a PMI, and a CQI.

Alternatively, a manner of mapping the joint transmission measurement hypothesis to the CSI report includes:

a PMI granularity and a CQI granularity in the CSI report are wideband, and mapping content of the joint transmission measurement hypothesis in the CSI report includes one or more of the following: one or more CRIs, a newly defined indicator field, one or more RIs, one or more LIs, one or more PMIs, and one or more CQIs.

Alternatively, a manner of mapping the joint transmission measurement hypothesis to the CSI report includes:

a PMI granularity and a CQI granularity in the CSI report are wideband, and mapping content of the joint transmission measurement hypothesis in the CSI report includes a first part (part 1) and a second part (part 2), where the first part includes one or more of the following: one CRI, a newly defined indicator, a plurality of RIs, one LI, one PMI, and one CQI; and the second part includes one or more of the following: one LI, one PMI, and one CQI;

or the first part includes one or more of the following: a plurality of CRIs, a plurality of RIs, one LI, one PMI, and one CQI; and the second part includes one or more of the following: one LI, one PMI, and one CQI;

or the first part includes one or more of the following: one CRI, a plurality of RIs, one LI, one PMI, and one CQI; and the second part includes one or more of the following: one LI, one PMI, and one CQI.

Alternatively, a manner of mapping the STRP measurement hypothesis to the CSI report includes:

a PMI granularity and a CQI granularity in the CSI report are subband, and mapping content of the STRP measurement hypothesis in the CSI report includes a first part, a second part and a third part, where the first part includes one or more of the following: one CRI, one newly defined indicator, one RI, a wideband channel quality indicator for first transport block (wideband CQI for first TB), a subband channel quality indicator for first transport block (subband CQI for first TB), and one non-zero wideband amplitude coefficient; the second part includes one or more of the following: a wideband channel quality indicator for second transport block (wideband CQI for second TB), one LI, and one wideband precoding matrix indicator (wideband PMI); and the third part includes one or more of the following: an even subband channel quality indicator for second transport block (even subband CQI for second TB), an even subband precoding matrix indicator (even subband PMI), an odd subband channel quality indicator for second transport block (odd subband CQI for second TB), and an odd subband precoding matrix indicator (odd subband PMI);

or the first part includes one or more of the following: one CRI, one RI, a wideband channel quality indicator for first transport block (wideband CQI for first TB), a subband channel quality indicator for first transport block (subband CQI for first TB), and a non-zero wideband amplitude coefficient; the second part includes one or more of the following: a wideband channel quality indicator for second transport block (wideband CQI for second TB), one LI, and one wideband precoding matrix indicator (wideband PMI); and the third part includes one or more of the following: an even subband channel quality indicator for second transport block (even subband CQI for second TB), an even subband precoding matrix indicator (even subband PMI), an odd subband channel quality indicator for second transport block (odd subband CQI for second TB), and an odd subband precoding matrix indicator (odd subband PMI).

Alternatively, a manner of mapping the joint transmission measurement hypothesis to the CSI report includes:

a PMI granularity and a CQI granularity in the CSI report are subband, and mapping content of the NCJT measurement hypothesis in the CSI report includes a first part, a second part and a third part, where the first part includes one or more of the following: one CRI, a newly defined indicator, one or more RIs, a wideband channel quality indicator for first transport block (wideband CQI for first TB), a subband channel quality indicator for first transport block (subband CQI for first TB), and one or more non-zero wideband amplitude coefficients; the second part includes one or more of the following: a wideband channel quality indicator for second transport block (wideband CQI for second TB), one or more LIs, one or more wideband precoding matrix indicators (wideband PMI), and wideband channel quality indicators for a plurality of transport blocks; and the third part includes one or more of the following: an even subband channel quality indicator for second transport block, a plurality of even subband precoding matrix indicators, a plurality of second even subband channel quality indicators for transport blocks, a plurality of second odd subband channel quality indicators for transport blocks, a plurality of odd subband precoding matrix indicators, an odd subband channel quality indicator for first transport block, and an odd subband channel quality indicator for second transport block;

or the first part includes one or more of the following: one or more CRIs, one or more RI fields, a wideband channel quality indicator for first transport block, a subband channel quality indicator for first transport block, and one or more non-zero wideband amplitude coefficients; the second part includes one or more of the following: a wideband channel quality indicator for second transport block, one or more LIs, a plurality of wideband precoding matrix indicators, a wideband channel quality indicator for first transport block, and a wideband channel quality indicator for second transport block; and the third part includes one or more of the following: an even subband channel quality indicator for second transport block, a plurality of even subband precoding matrix indicators, an even subband channel quality indicator for first transport block, an even subband channel quality indicator for second transport block, one even subband precoding matrix indicator, an odd subband channel quality indicator for second transport block, a plurality of odd subband precoding matrix indicators, and odd subband channel quality indicators for a plurality of transport blocks;

or the first part includes one or more of the following: a CRI, one or more RIs, a wideband channel quality indicator for first transport block, a subband channel quality indicator for first transport block, and one or more non-zero wideband amplitude coefficients; the second part includes one or more of the following: wideband channel quality indicators for a plurality of second transport blocks, one or more LIs, one or more wideband precoding matrix indicators, a wideband channel quality indicator for first transport block, and a wideband channel quality indicator for second transport block; and the third part includes one or more of the following: an even subband channel quality indicator for second transport block, one or more even wideband precoding matrix indicators, a subband channel quality indicator for first transport block, a subband channel quality indicator for second transport block, a plurality of second odd subband channel quality indicators for transport blocks, one or more odd wideband precoding matrix indicators, and an odd subband channel quality indicator for first transport block.

In an implementation of this application, the CSI report includes one or more of the following:

(1) mapping content of at least some joint transmission measurement hypotheses; and (2) mapping content of at least some STRP measurement hypotheses.

In an implementation of this application, a transmission priority of each CSI report in the plurality of CSI reports includes one or more of the following:

(1) for a plurality of aperiodic CSI reports reported based on a PUSCH, all of which do not carry layer 1 reference signal received powers (L1-RSRP) or layer 1 signal to interference plus noise ratios (L1-SINR), a priority of an MTRP CSI report is higher than a priority of a non-MTRP CSI report;

(2) for a plurality of semi-persistent CSI reports reported based on a PUSCH, all of which do not carry L1-RSRPs or L1-SINRs, a priority of an MTRP CSI report is higher than a priority of a non-MTRP CSI report;

(3) for a plurality of semi-persistent CSI reports reported based on a PUCCH, all of which do not carry L1-RSRPs or L1-SINRs, a priority of an MTRP CSI report is higher than a priority of a non-MTRP CSI report; and (4) for a plurality of periodic CSI reports reported based on a PUCCH, all of which do not carry L1-RSRPs or L1-SINRs, a priority of an MTRP CSI report is higher than a priority of a non-MTRP CSI report.

In other words, all the plurality of aperiodic CSI reports reported based on the PUSCH, or the plurality of semi-persistent CSI reports reported based on the PUSCH, or the plurality of semi-persistent CSI reports reported based on the PUCCH, or the plurality of periodic CSI reports reported based on the PUCCH do not carry L1-RSRPs or L1-SINRs, and the priority of the MTRP CSI report is higher than the priority of the non-MTRP CSI report, or conversely.

For example, the priority of the MTRP CSI report is higher than the priority of the non-MTRP CSI report, and a corresponding calculation formula may be: $\mathrm{Pri}_{iCSI}(y,k,m,c,s)=2\cdot N_{cells}\cdot M_s\cdot y+N_{cells}\cdot M_s\cdot k+N_{cells}\cdot M_s\cdot m/2+Ms\cdot c+s$, where m=0 indicates that the report carries an MTRP CSI report, and m=1 indicates that the report carries an STRP CSI report.

An implementation of this application includes one or more of the following:

a transmission priority of the joint transmission measurement hypothesis is higher than a transmission priority of the STRP measurement hypothesis; and transmission priorities of the wideband information of the joint transmission measurement hypothesis and the wideband information of the STRP measurement hypothesis are higher than transmission priorities of the subband information of the joint transmission measurement hypothesis and the subband information of the STRP measurement hypothesis.

In some embodiments of this application, when only one CRI is reported in the joint transmission measurement hypothesis and a plurality of RIs, PMIs, and LIs are included, the mapping sequence needs to match the CRI or a CMR sequence indicated by the CRI.

(a) For example, if CRI0 is defined as CMR1 and CMR2 (a pair of CMRs associated with the joint transmission measurement hypothesis), the mapping sequence is to first map an RI, a PMI, and an LI related to CMR1, and then map an RI, a PMI, and an LI related to CMR2.

(b) For example, if CRI0 is defined as CMR1 in CMR1 and CMR2 (a pair of CMRs associated with the joint transmission measurement hypothesis), the mapping sequence is to first map an RI, a PMI, and an LI related to CMR1, and then map an RI, a PMI, and an LI related to CMR2.

In this embodiment of this application, the terminal can report content of one or more measurement hypotheses in a plurality of types of measurement hypotheses to the network-side device by using the first field in the CSI report, thereby reducing CSI report feedback overheads and better supporting MTRP transmission.

Embodiments of this application are hereinafter described with reference to Embodiment 1 to Embodiment 6.

Embodiment 1

When higher layer signaling configures UE to select an optimal measurement hypothesis for reporting, and CMR0 and CMR1 are configured in a CSI reporting setting, if the UE selects an STRP measurement hypothesis corresponding to CMR0 for reporting, the UE can notify, by setting a CRI field of a CSI report to CRI0, a base station that the CSI report corresponds to an STRP measurement hypothesis; or if the UE selects an NCJT measurement hypothesis corresponding to CMR0 and CMR1 for reporting, the UE can notify, by setting a CRI field of a CSI report to CRI2, a base station that the CSI report corresponds to an NCJT measurement hypothesis.

Definitions of CRIs are shown in Table 4.

TABLE 4

| CRI0 | CRI1 | CRI2 |
|---|---|---|
| CMR0 | CMR1 | CMR0 and CMR1 |

Embodiment 2

When higher layer signaling configures UE to select an optimal measurement hypothesis for reporting, and CMR0 and CMR1 are configured in a CSI reporting setting, if the UE selects an STRP measurement hypothesis corresponding to CMR0 for reporting, the UE can notify, by setting a CRI field of a CSI report to CRI0 and setting an NCJT indicator field of the CSI report to 0 (adding 1 bit), a base station that the CSI report corresponds to an STRP measurement hypothesis; or if the UE selects an NCJT measurement hypothesis corresponding to CMR0 and CMR2 for reporting, the UE can notify, by setting a CRI field of a CSI report to CRI0 or CRI1 and setting an NCJT indicator field of the CSI report to 1, a base station that the CSI report corresponds to an NCJT measurement hypothesis.

Embodiment 3

When higher layer signaling configures UE to report two STRP measurement hypotheses and one NCJT measurement hypothesis, and CMR0 and CMR1 are configured in a CSI reporting setting, there are three RI-related fields of a CSI report, where a first RI field corresponds to CMR0 associated with an STRP measurement hypothesis, a second RI field corresponds to CMR1 associated with an STRP measurement hypothesis, a third RI field corresponds to CMR0 and CMR1 corresponding to one NCJT measurement hypothesis, and the third RI field indicates that one index value corresponds to one group of rank values, as shown in Table 5.

TABLE 5

| Index | A group of rank indicators |
|---|---|
| 0 | (1, 1) |
| 1 | (1, 2) |
| 2 | (2, 1) |
| 3 | (2, 2) |
| . . . | . . . |

If an indicated index value is 1, a value of a rank indicator corresponding to CMR0 is 1, and a value of a rank indicator corresponding to CMR1 is 2.

Embodiment 4

When higher layer signaling configures UE to report an optimal measurement hypothesis, and CMR0 and CMR1 are configured in a CSI reporting setting, there is one RI-related field of a CSI report. When the UE indicates, in another manner, that TRP reporting content is STRP CSI corresponding to CMR0, an RI field indicates a value of a rank indicator of an STRP measurement hypothesis associated with corresponding CMR0. When the UE indicates, in another manner, that TRP reporting content is NCJT CSI corresponding to CMR0 and CMR1, an RI field indicates a group of rank values, as shown in Table 6.

TABLE 6

| Index | A group of rank indicators |
|---|---|
| 0 | (1, 1) |
| 1 | (1, 2) |
| 2 | (2, 1) |
| 3 | (2, 2) |
| . . . | . . . |

If an indicated index value is 1, a value of a rank indicator corresponding to CMR0 is 1, and a value of a rank indicator corresponding to CMR1 is 2.

Embodiment 5

When higher layer signaling configures UE to report an optimal measurement hypothesis, and CMR0 and CMR1 are configured in a CSI reporting setting, there is one RI-related field of a CSI report. When CMR0 corresponds to TRP0 and a rank value that may be supported for STRP transmission is rank 1/2/3 (2 bits), and CMR1 corresponds to TRP1 and a rank value that may be supported for STRP transmission is rank 2/3 (1 bit), and a group of rank indicators supported by TRP0 and TRP1 corresponding to CMR0 and CMR1 for NCJT transmission is <1, 2> and <2, 2> (1 bit), a bitwidth of an RI field corresponding to the CSI report is 2 bits. When the UE selects an NCJT transmission hypothesis for reporting, a group of rank indicators corresponding to "00" is <1, 2>, and a group of rank indicators corresponding to "01" is <2, 2>.

Embodiment 6

When higher layer signaling configures UE to report an optimal STRP measurement hypothesis and an optimal NCJT measurement hypothesis, and CMR0 and CMR1 are configured in a CSI reporting setting, there are two RI-related fields of a CSI report, where a first RI field corresponds to one STRP measurement hypothesis, and a second RI field corresponds to one NCJT measurement hypothesis. When CMR0 corresponds to TRP0 and a value of a rank indicator that may be supported for STRP transmission is rank 1/2/3 (2 bits), and CMR1 corresponds to TRP1 and a rank value that may be supported for STRP transmission is rank 2/3 (1 bit), and a group of rank indicators supported by TRP0 and TRP1 corresponding to CMR0 and CMR1 for NCJT transmission is <1, 2> and <2, 2> (1 bit), a bitwidth of the first RI field corresponding to the CSI report is 2 bits, and a bitwidth of the second RI field corresponding to the CSI report is 1 bit.

Figure 4:
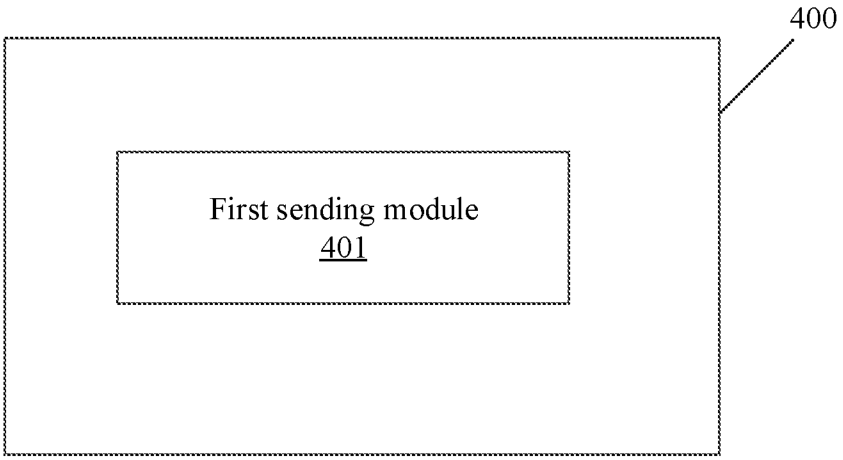
FIG. 4 is a first schematic diagram of a CSI feedback apparatus according to an embodiment of this application.

Referring to FIG. 4, an embodiment of this application provides a CSI feedback apparatus, applied to a terminal. The apparatus 400 includes:

a first sending module 401, configured to feed back one or more CSI reports to a network-side device, where a first field in the CSI report represents a first measurement hypothesis, where the first measurement hypothesis includes: X STRP measurement hypotheses and one joint transmission measurement hypothesis, where X is a natural number; or the first measurement hypothesis is one of all STRP measurement hypotheses and joint transmission measurement hypotheses.

In an implementation of this application, in a case that the first field is an RI field and that the first measurement hypothesis is one of all the STRP measurement hypotheses and joint transmission measurement hypotheses, a bitwidth of the RI field is determined based on one or more of the following:

a quantity of antenna ports;

a bitwidth corresponding to a quantity o rank indicators allowed for STRP transmission;

a bitwidth corresponding to a quantity of rank indicators allowed for joint transmission;

a total quantity of rank indicators supported by the terminal; and a total quantity of rank indicator combinations supported by the terminal.

The total quantity of rank indicators supported by the terminal may be understood as the quantity of rank indicators supported by the terminal for STRP transmission, and/or the quantity of rank indicators supported for joint transmission. The total quantity of rank indicator combinations supported by the terminal may be understood as the quantity of rank indicator combinations supported by the terminal for STRP transmission, and/or the quantity of rank indicator combinations supported for joint transmission. Support may also be understood as permission.

In an implementation of this application, the bitwidth of the RI field is one of the following: a first value, where the first value includes 0, or min(1, max($\lceil \log_2 n_{RI} \rceil_{trp1_{strp}}$, . . . , $\lceil \log_2 n_{RI} \rceil_{trpN_{strp}}$, $\lceil \log_2 n_{RI} \rceil_{trp1_{jt}}$+ . . . +$\lceil \log_2 n_{RI} \rceil_{trpN_{jt}}$)), or min (2, max($\lceil \log_2 n_{RI} \rceil_{trp1_{strp}}$, . . . , $\lceil \log_2 n_{RI} \rceil_{trpN_{strp}}$, $\lceil \log_2 n_{RI} \rceil_{trp1_{jt}}$, $\lceil \log_2 n_{RI} \rceil_{trpN_{jt}}$)), or min(3, max($\lceil \log_2 n_{RI} \rceil_{trp1_{strp}}$, . . . , $\lceil \log_2 n_{RI} \rceil_{trpN_{strp}}$, $\lceil \log_2 n_{RI} \rceil_{trp1_{jt}}$+ . . . +$\lceil \log_2 n_{RI} \rceil_{trpN_{jt}}$)), or min (4, max($\lceil \log_2 n_{RI} \rceil_{trp1_{strp}}$, $\lceil \log_2 n_{RI} \rceil_{trpN_{strp}}$, $\lceil \log_2 n_{RI} \rceil_{trp1_{jt}}$+ . . . +$\lceil \log_2 n_{RI} \rceil_{trpN_{jt}}$)), or max($\lceil \log_2 n_{RI} \rceil_{trp1_{strp}}$, . . . , $\lceil \log_2 n_{RI} \rceil_{trpN_{strp}}$, $\lceil \log_2 n_{RI} \rceil_{trp1_{jt}}$+ . . . +$\lceil \log_2 n_{RI} \rceil_{trpN_{jt}}$);

a second value, where the second value includes 0, or min(1, max($\lceil \log_2 n_{RI} \rceil_{trp1_{strp}}$, . . . , $\lceil \log_2 n_{RI} \rceil_{trpN_{strp}}$, $\lceil \log_2 N_{RI\_jt} \rceil$)), or min(2, max($\lceil \log_2 n_{RI} \rceil_{trp1_{strp}}$, . . . , $\lceil \log_2 n_{RI} \rceil_{trpN_{strp}}$, $\lceil \log_2 N_{RI\_jt} \rceil$)), or min(3, max ($\lceil \log_2 n_{RI} \rceil_{trp1_{strp}}$, $\lceil \log_2 n_{RI} \rceil_{trpN_{strp}}$, $\lceil \log_2 n_{RI\_jt} \rceil$)), or min (4, max($\lceil \log_2 n_{RI} \rceil_{trp1_{strp}}$, . . . , $\lceil \log_2 N_{RI} \rceil_{trpN_{strp}}$, $\lceil \log_2 N_{RI\_jt} \rceil$)), or max($\lceil \log_2 n_{RI} \rceil_{trp1_{strp}}$, . . . , $\lceil \log_2 n_{RI} \rceil_{trpN_{strp}}$, $\lceil \log_2 N_{RI\_jt} \rceil$), where $N_{RI\_jt}$ represents the total quantity of supported rank indicator combinations;

a third value, where the third value includes 0 or $\lceil \log_2 n_{RI} \rceil$, where $N_{RI}$ represents the total quantity of supported rank indicators or rank indicator combinations, where $\lceil \log_2 n_{RI} \rceil_{trp1_{strp}}$ represents a bitwidth corresponding to a quantity of rank indicators allowed for STRP transmission of a first TRP, $\lceil \log_2 n_{RI} \rceil_{trp1_{ncjt}}$ represents a bitwidth corresponding to a quantity of rank indicators allowed for joint transmission of the first TRP, $\lceil \log_2 n_{RI} \rceil_{trpN_{strp}}$ represents a bitwidth corresponding to a quantity of rank indicators allowed for STRP transmission of an $N^{th}$ TRP, $\lceil \log_2 n_{RI} \rceil_{trpN_{ncjt}}$ represents a bitwidth corresponding to a quantity of rank indicators allowed for joint transmission of the $N^{th}$ TRP, and N is greater than or equal to 2.

In an implementation of this application, in a case that the bitwidth of the RI field is the first value, if the first measurement hypothesis is an STRP measurement hypothesis, one code point of the RI field corresponds to one rank indicator, or if the first measurement hypothesis is a joint transmission measurement hypothesis, first $\lceil \log_2 n_{RI} \rceil_{trp1_{jt}}$ bits of the RI field correspond to one rank indicator of the first TRP, and $\lceil \log_2 n_{RI} \rceil_{trpN_{jt}}$ bits after the first $\lceil \log_2 n_{RI} \rceil_{trp1_{jt}}$ bits correspond to one rank indicator of the $N^{th}$ TRP, or first $\lceil \log_2 n_{RI} \rceil_{trp1_{jt}}$ bits of the RI field correspond to one rank indicator of the first TRP, and last $\lceil \log_2 n_{RI} \rceil_{trpN_{jt}}$ bits of the RI field correspond to one rank indicator of the $N^{th}$ TRP;

or in a case that the bitwidth of the RI field is the second value, if the first measurement hypothesis is an STRP measurement hypothesis, one code point of the RI field corresponds to one rank indicator, or if the first measurement hypothesis is a joint transmission measurement hypothesis, one code point of the RI field corresponds to a group of rank indicators;

or in a case that the bitwidth of the RI field is the third value, one code point of the RI field corresponds to one rank indicator or corresponds to a group of rank indicators.

In an implementation of this application, in a case that the first measurement hypothesis is one of all the STRP measurement hypotheses and joint transmission measurement hypotheses, a bitwidth of the CRI field in the CSI report is $\lceil \log_2(K_s+N) \rceil$, where $K_s$ represents a quantity of channel measurement resources associated with a reporting setting, and N represents a quantity of CMR pairs associated with the reporting setting.

In an implementation of this application, the apparatus 400 further includes:

a second sending module, configured to: in a case that the first measurement hypothesis is one of all the STRP measurement hypotheses and joint transmission measurement hypotheses, indicate, by the terminal to the network-side device by using the first field in the CSI report, that a type of the first measurement hypothesis is an STRP measurement hypothesis or a joint transmission measurement hypothesis, where the first field is a CRI field, an RI field, or a newly defined indicator field.

In an implementation of this application, in a case that the first measurement hypothesis includes the X STRP measurement hypotheses and the one joint transmission measurement hypothesis, a quantity of RI fields in the CSI report is:

X+1, where X RI fields correspond to the X STRP measurement hypotheses, and one RI field corresponds to the one joint transmission measurement hypothesis;

X+2, where X RI fields correspond to the X STRP measurement hypotheses, and two RI fields correspond to the one joint transmission measurement hypothesis;

1, where one RI field corresponds to the X STRP measurement hypotheses and the one joint transmission measurement hypothesis; or 2, where one RI field corresponds to the X STRP measurement hypotheses, and one RI field corresponds to the one joint transmission measurement hypothesis.

In an implementation of this application, in a case that the quantity of RI fields is X+1 or X+2, a sequence of mapping the joint transmission measurement hypothesis and STRP measurement hypotheses to the RI fields includes: the joint transmission measurement hypothesis takes precedence over the STRP measurement hypotheses, or the STRP measurement hypotheses take precedence over the joint transmission measurement hypothesis.

In an implementation of this application, in a case that the quantity of RI fields is X+1, a first RI field corresponds to the one joint transmission measurement hypothesis, and a bitwidth of the first RI field is determined based on one or more of the following:

a quantity of antenna ports;

a bitwidth corresponding to a quantity of rank indicators allowed for joint transmission;

a total quantity of rank indicators supported by the terminal; and a total quantity of rank indicator combinations supported by the terminal.

The total quantity of rank indicator combinations supported by the terminal may be understood as the quantity of rank indicator combinations supported by the terminal for STRP transmission, and/or the quantity of rank indicator combinations supported for joint transmission. Support may also be understood as permission.

In an implementation of this application, the bitwidth of the first RI field is one of the following:

a fourth value, where the fourth value includes 0, or $\min(1, \lceil \log_2 n_{RI} \rceil_{trp1_{jt}} + \ldots + \lceil \log_2 n_{RI} \rceil_{trpN_{jt}})$, or $\min(2, \lceil \log_2 n_{RI} \rceil_{trp1_{jt}} + \ldots + \lceil \log_2 n_{RI} \rceil_{trpN_{jt}})$, or $\min(3, \lceil \log_2 n_{RI} \rceil_{trp1_{jt}} + \ldots + \lceil \log_2 n_{RI} \rceil_{trpN_{jt}})$, or $\min(4, \lceil \log_2 n_{RI} \rceil_{trp1_{jt}} + \ldots + \lceil \log_2 n_{RI} \rceil_{trpN_{jt}})$, or $\lceil \log_2 n_{RI} \rceil_{trp1_{jt}} + \ldots + \lceil \log_2 n_{RI} \rceil_{trpN_{jt}}$, where $\lceil \log_2 n_{RI} \rceil_{trp1_{jt}}$ represents a bitwidth corresponding to a quantity of rank indicators allowed for joint transmission of a first TRP, and $\lceil \log_2 n_{RI} \rceil_{trpN_{jt}}$ represents a bitwidth corresponding to a quantity of rank indicators allowed for joint transmission of an $N^{th}$ TRP; and a fifth value, where the fifth value includes 0, or $\min(1, \lceil \log_2 N_{RI\_jt} \rceil)$, $\min(2, \lceil \log_2 N_{RI\_jt} \rceil)$, or $\min(3, \lceil \log_2 N_{RI\_jt} \rceil)$, or $\min(4, \lceil \log_2 N_{RI\_jt} \rceil)$, or $\lceil \log_2 N_{RI\_jt} \rceil$, where $N_{RI\_jt}$ represents the total quantity of supported rank indicator combinations.

In an implementation of this application, in a case that the bitwidth of the first RI field is the fourth value, first $\lceil \log_2 n_{RI} \rceil_{trp1_{jt}}$ bits of the first RI field correspond to one rank indicator of the first TRP, and $\lceil \log_2 n_{RI} \rceil_{trp2_{jt}}$ bits after the first $\lceil \log_2 n_{RI} \rceil_{trp1_{jt}}$ bits correspond to one rank indicator of the $N^{th}$ TRP;

or first $\lceil \log_2 n_{RI} \rceil_{trp1_{jt}}$ bits of the first RI field correspond to one rank indicator of the first TRP, and last $\lceil \log_2 n_{RI} \rceil_{trp2_{jt}}$ bits of the first RI field correspond to one rank indicator of a second TRP;

or in a case that the bitwidth of the first RI field is the fifth value, one code point of the first RI field corresponds to a group of rank indicators, where N is greater than or equal to 2.

In an implementation of this application, in a case that the quantity of RI fields is X+1 or X+2, and X=1, a second RI field corresponds to one STRP measurement hypothesis, and a bitwidth of the second RI field is determined based on one or more of the following:

a quantity of antenna ports; and a bitwidth corresponding to a quantity of rank indicators allowed for STRP transmission.

In an implementation of this application, the bitwidth of the second RI field is a sixth value; and the sixth value includes 0, or $\min(1, \max(\lceil \log_2 n_{RI} \rceil_{trp1_{strp}}, \ldots, \lceil \log_2 n_{RI} \rceil_{trpN_{strp}}))$, or $\min(2, \max(\lceil \log_2 n_{RI} \rceil_{trp1_{strp}}, \ldots, \lceil \log_2 n_{RI} \rceil_{trpN_{strp}})$ or $\min(3, \max(\lceil \log_2 n_{RI} \rceil_{trp1_{strp}}, \ldots, \lceil \log_2 n_{RI} \rceil_{trpN_{strp}}))$, or $\min(4, \max(\lceil \log_2 n_{RI} \rceil_{trp1_{strp}}))$, or $\max(\lceil \log_2 n_{RI} \rceil_{trp1_{strp}}, \ldots, \lceil \log_2 n_{RI} \rceil_{trpN_{strp}})$, where $\lceil \log_2 n_{RI} \rceil_{trp1_{strp}}$ represents a bitwidth corresponding to a quantity of rank indicators allowed for STRP transmission of a first TRP, and $\lceil \log_2 n_{RI} \rceil_{trpN_{strp}}$ represents a bitwidth corresponding to a quantity of rank indicators allowed for STRP transmission of an $N^{th}$ TRP; and N is greater than or equal to 2.

In an implementation of this application, in a case that there is only one RI field, a bitwidth of the RI field is determined based on one or more of the following:

a quantity of antenna ports;

a bitwidth corresponding to a quantity of rank indicators allowed for STRP transmission;

a total quantity of rank indicator combinations supported by the terminal; and a bitwidth corresponding to a quantity of rank indicators allowed for joint transmission.

The total quantity of rank indicator combinations supported by the terminal may be understood as the quantity of rank indicator combinations supported by the terminal for STRP transmission, and/or the quantity of rank indicator combinations supported for joint transmission. Support may also be understood as permission.

In an implementation of this application, the bitwidth of the RI field is one of the following:

a seventh where value, the seventh value includes 0, or $\min(1, \lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{jt}} + \ldots + \lceil \log_2 n_{RI} \rceil_{trpN_{jt}})$, or $\min(2, \lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{jt}} + \ldots + \lceil \log_2 n_{RI} \rceil_{trpN_{jt}})$, or $\min(3, \lceil \log_2 n_{RI} \rceil_{trp1_{strp}} + \ldots + \lceil \log_2 n_{RI} \rceil_{trpN_{strp}} + \lceil \log_2$ $n_{RI}\rceil_{trp1_{jt}} + \ldots + \lceil \log_2 n_{RI} \rceil_{trpN_{jt}})$, or $\min(4, \lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{jt}} + \ldots + \lceil \log_2 n_{RI} \rceil_{trpN_{jt}})$, or $\lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{ncjt}} + \ldots + \lceil \log_2 \rceil_{trpN_{jt}}$; and an eighth value, where the eighth value includes 0, or $\min(1, \lceil \log_2 n_{RI} \rceil_{trp1_{strp}} + \ldots + \lceil \log_2 n_{RI} \rceil_{trpN_{strp}} + \lceil \log_2 N_{RI\_jt} \rceil)$, or $\min(2, \lceil \log_2 n_{RI} \rceil_{trp1_{strp}} + \ldots + \lceil \log_2 n_{RI} \rceil_{trpN_{strp}} + \lceil \log_2 N_{RI\_jt} \rceil)$, or $\min(3, \lceil \log_2 n_{RI} \rceil_{trp1_{strp}} + \ldots + \lceil \log_2 n_{RI} \rceil_{trpN_{strp}} + \lceil \log_2 N_{RI\_jt} \rceil)$, or $\min(4, \lceil \log_2 n_{RI} \rceil_{trp1_{strp}} + \ldots + \lceil \log_2 n_{RI} \rceil_{trpN_{strp}} + \lceil \log_2 N_{RI\_jt})$, or $\lceil \log_2 n_{RI} \rceil_{trp1_{strp}} + \ldots + \lceil \log_2 n_{RI} \rceil_{trpN_{strp}} + \lceil \log_2 n_{RI\_jt} \rceil$, where $N_{RI\_jt}$ represents the total quantity of supported rank indicator combinations;

$\lceil \log_2 n_{RI} \rceil_{trp1_{strp}}$ represents a bitwidth corresponding to a quantity of rank indicators allowed for STRP transmission of a first TRP, $\lceil \log_2 n_{RI} \rceil_{trp1_{jt}}$ represents a bitwidth corresponding to a quantity of rank indicators allowed for joint transmission of the first TRP, $\lceil \log_2 n_{RI} \rceil_{trpN_{strp}}$ represents a bitwidth corresponding to a quantity of rank indicators allowed for STRP transmission of an $N^{th}$ TRP, and $\lceil \log_2 n_{RI} \rceil_{trpN_{jt}}$ represents a bitwidth corresponding to a quantity of rank indicators allowed for joint transmission of the $N^{th}$ TRP; and N is greater than or equal to 2.

In an implementation of this application, the apparatus 400 further includes:

a first receiving module, configured to receive higher layer signaling, where the higher layer signaling is used to limit the first field in the CSI report, and the higher layer signaling is in a one-to-correspondence with a TRP, or there is a mapping relationship between the higher layer signaling and a CMR or a CMR group.

In an implementation of this application, a manner of mapping the STRP measurement hypothesis to the CSI report includes:

a PMI granularity and a CQI granularity in the CSI report are wideband, and mapping content of the STRP measurement hypothesis in the CSI report includes one or more of the following: a CRI, a newly defined indicator, an RI, an LI, a PMI, and a CQI;

alternatively, a manner of mapping the joint transmission measurement hypothesis to the CSI report includes:

a PMI granularity and a CQI granularity in the CSI report are wideband, and mapping content of the joint transmission measurement hypothesis in the CSI report includes one or more of the following: one or more CRIs, a newly defined indicator field, one or more RIs, one or more LIs, one or more PMIs, and one or more CQIs;

alternatively, a manner of mapping the joint transmission measurement hypothesis to the CSI report includes:

a PMI granularity and a CQI granularity in the CSI report are wideband, and mapping content of the joint transmission measurement hypothesis in the CSI report includes a first part and a second part, where the first part includes one or more of the following: one CRI, a newly defined indicator, a plurality of RIs, one LI, one PMI, and one CQI; and the second part includes one or more of the following: one LI, one PMI, and one CQI;

or the first part includes one or more of the following: a plurality of CRIs, a plurality of RIs, one LI, one PMI, and one CQI; and the second part includes one or more of the following: one LI, one PMI, and one CQI;

or the first part includes one or more of the following: one CRI, a plurality of RIs, one LI, one PMI, and one CQI; and the second part includes one or more of the following: one LI, one PMI, and one CQI;

alternatively, a manner of mapping the STRP measurement hypothesis to the CSI report includes:

a PMI granularity and a CQI granularity in the CSI report are subband, and mapping content of the STRP measurement hypothesis in the CSI report includes a first part, a second part and a third part, where the first part includes one or more of the following: one CRI, one newly defined indicator, one RI, a wideband channel quality indicator for first transport block, a subband channel quality indicator for first transport block, and one non-zero wideband amplitude coefficient; the second part includes one or more of the following: a wideband channel quality indicator for second transport block, one LI, and one wideband precoding matrix indicator; and the third part includes one or more of the following: an even subband channel quality indicator for second transport block, an even subband precoding matrix indicator, an odd subband channel quality indicator for second transport block, and an odd subband precoding matrix indicator;

or the first part includes one or more of the following: one CRI, one RI, a wideband channel quality indicator for first transport block, a subband channel quality indicator for first transport block, and a non-zero wideband amplitude coefficient; the second part includes one or more of the following: a wideband channel quality indicator for second transport block, one LI, and one wideband precoding matrix indicator; and the third part includes one or more of the following: an even subband channel quality indicator for second transport block, an even subband precoding matrix indicator, an odd subband channel quality indicator for second transport block, and an odd subband precoding matrix indicator;

alternatively, a manner of mapping the joint transmission measurement hypothesis to the CSI report includes:

a PMI granularity and a CQI granularity in the CSI report are subband, and mapping content of the NCJT measurement hypothesis in the CSI report includes a first part, a second part and a third part, where the first part includes one or more of the following: one CRI, a newly defined indicator, one or more RIs, a wideband channel quality indicator for first transport block, a subband channel quality indicator for first transport block, and one or more non-zero wideband amplitude coefficients; the second part includes one or more of the following: a wideband channel quality indicator for second transport block, one or more LIs, one or more wideband precoding matrix indicators, and wideband channel quality indicators for a plurality of transport blocks; and the third part includes one or more of the following: an even subband channel quality indicator for second transport block, a plurality of even subband precoding matrix indicators, even subband channel quality indicators for a plurality of second transport blocks, a plurality of second odd subband channel quality indicators for transport blocks, a plurality of odd subband precoding matrix indicators, an odd subband channel quality indicator for first transport block, and an odd subband channel quality indicator for second transport block;

or the first part includes one or more of the following: one or more CRIs, one or more RI fields, a wideband channel quality indicator for first transport block, a subband channel quality indicator for first transport block, and one or more non-zero wideband amplitude coefficients; the second part includes one or more of the following: a wideband channel quality indicator for second transport block, one or more LIs, a plurality of wideband precoding matrix indicators, a wideband channel quality indicator for first transport block, and a wideband channel quality indicator for second transport block; and the third part includes one or more of the following: an even subband channel quality indicator for second transport block, a plurality of even subband precoding matrix indicators, an even subband channel quality indicator for first transport block, an even subband channel quality indicator for second transport block, one even subband precoding matrix indicator, an odd subband channel quality indicator for second transport block, a plurality of odd subband precoding matrix indicators, and odd subband channel quality indicators for a plurality of transport blocks;

or the first part includes one or more of the following: a CRI, one or more RIs, a wideband channel quality indicator for first transport block, a subband channel quality indicator for first transport block, and one or more non-zero wideband amplitude coefficients; the second part includes one or more of the following: wideband channel quality indicators for a plurality of second transport blocks, one or more LIs, one or more wideband precoding matrix indicators, a wideband channel quality indicator for first transport block, and a wideband channel quality indicator for second transport block; and the third part includes one or more of the following: an even subband channel quality indicator for second transport block, one or more even wideband precoding matrix indicators, a subband channel quality indicator for first transport block, a subband channel quality indicator for second transport block, a plurality of second odd subband channel quality indicators for transport blocks, one or more odd wideband precoding matrix indicators, and an odd subband channel quality indicator for first transport block.

In an implementation of this application, the CSI report includes one or more of the following:

mapping content of at least some joint transmission measurement hypotheses; and mapping content of at least some STRP measurement hypotheses.

In an implementation of this application, the apparatus further includes:

a determining module, configured to: when the plurality of CSI reports include MTRP CSI reports, determine, by the terminal, one or more of a transmission priority of a CSI report in the plurality of CSI reports and a transmission priority of CSI content in the MTRP CSI reports, where the CSI content in the MTRP CSI reports includes one or more of the following: CSI content corresponding to the joint transmission measurement hypothesis, CSI content corresponding to the STRP measurement hypothesis, wideband information of the joint transmission measurement hypothesis, wideband information of the STRP measurement hypothesis, subband information of the joint transmission measurement hypothesis, and subband information of the STRP measurement hypothesis.

In an implementation of this application, a transmission priority of each CSI report in the plurality of CSI reports includes one or more of the following:

for a plurality of aperiodic CSI reports reported based on a PUSCH, all of which do not carry L1-RSRPs or L1-SINRs, a priority of an MTRP CSI report is higher than a priority of a non-MTRP CSI report;

for a plurality of semi-persistent CSI reports reported based on a PUSCH, all of which do not carry L1-RSRPs or L1-SINRs, a priority of an MTRP CSI report is higher than a priority of a non-MTRP CSI report;

for a plurality of semi-persistent CSI reports reported based on a PUCCH, all of which do not carry L1-RSRPs or L1-SINRs, a priority of an MTRP CSI report is higher than a priority of a non-MTRP CSI report; and for a plurality of periodic CSI reports reported based on a PUCCH, all of which do not carry L1-RSRPs or L1-SINRs, a priority of an MTRP CSI report is higher than a priority of a non-MTRP CSI report.

In an implementation of this application, the transmission priority of the CSI content in the MTRP CSI reports includes one or more of the following:

a transmission priority of the joint transmission measurement hypothesis is higher than a transmission priority of the STRP measurement hypothesis; and transmission priorities of the wideband information of the joint transmission measurement hypothesis and the wideband information of the STRP measurement hypothesis are higher than transmission priorities of the subband information of the joint transmission measurement hypothesis and the subband information of the STRP measurement hypothesis.

The apparatus provided in this embodiment of this application can implement each process implemented by the method embodiment in FIG. 2, with the same technical effect achieved. To avoid repetition, details are not described herein again.

Figure 5:
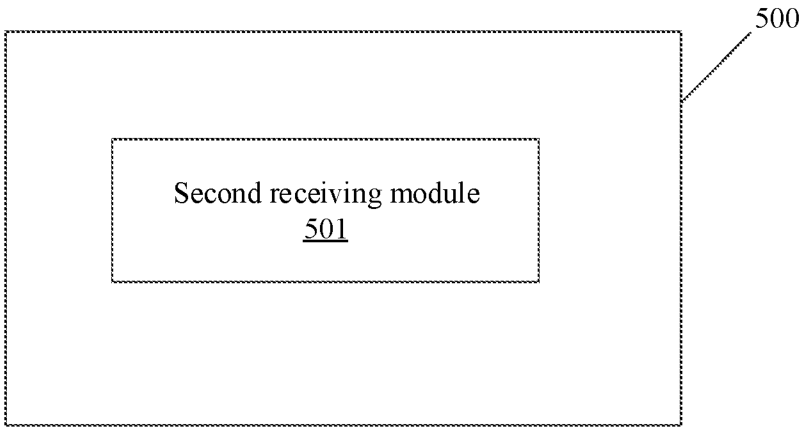
FIG. 5 is a second schematic diagram of a CSI feedback apparatus according to an embodiment of this application.

Referring to FIG. 5, an embodiment of this application provides a CSI feedback apparatus, applied to a network-side device. The apparatus 500 includes:

a second receiving module 501, configured to receive one or more CSI reports, where the CSI report includes a first field corresponding to a first measurement hypothesis, where the first measurement hypothesis includes: X STRP measurement hypotheses and one joint transmission measurement hypothesis, where X is a positive integer; or the first measurement hypothesis is one of all STRP measurement hypotheses and joint transmission measurement hypotheses.

In an implementation of this application, in a case that the first field is an RI field and that the first measurement hypothesis is one of all the STRP measurement hypotheses and joint transmission measurement hypotheses, a bitwidth of the RI field is determined based on one or more of the following:

a quantity of antenna ports;

a bitwidth corresponding to a quantity of rank indicators allowed for STRP transmission;

a bitwidth corresponding to a quantity of rank indicators allowed for joint transmission;

a total quantity of rank indicators supported by the terminal; and a total quantity of rank indicator combinations supported by the terminal.

The total quantity of rank indicators supported by the terminal may be understood as the quantity of rank indicators supported by the terminal for STRP transmission, and/or the quantity of rank indicators supported for joint transmission. The total quantity of rank indicator combinations supported by the terminal may be understood as the quantity of rank indicator combinations supported by the terminal for STRP transmission, and/or the quantity of rank indicator combinations supported for joint transmission. Support may also be understood as permission.

In an implementation of this application, the bitwidth of the RI field is one of the following:

a first value, where the first value includes 0, or min(1, max($\lceil \log_2 n_{RI} \rceil_{trp1_{strp}}$, . . . , $\lceil \log_2 n_{RI} \rceil_{trpN_{strp}}$, $\lceil \log_2 n_{RI} \rceil_{trp1_{jt}}$+ . . . +$\lceil \log_2 n_{RI} \rceil_{trpN_{jt}}$)), or min(2, max ($\lceil \log_2 n_{RI} \rceil_{trp1_{strp}}$, . . . , $\lceil \log_2 n_{RI} \rceil_{trpN_{strp}}$, $\lceil \log_2 n_{RI} \rceil_{trp1_{jt}}$+ $\lceil \log_2 n_{RI} \rceil_{trpN_{jt}}$)), or min(3, max($\lceil \log_2 n_{RI} \rceil_{trp1_{strp}}$, . . . , $\lceil \log_2 n_{RI} \rceil_{trpN_{strp}}$, $\lceil \log_2 n_{RI} \rceil_{trp1_{jt}}$+ . . . +$\lceil \log_2 n_{RI} \rceil_{trpN_{jt}}$), or min(4, max($\lceil \log_2 n_{RI} \rceil_{trp1_{strp}}$, . . . , $\lceil \log_2 n_{RI} \rceil_{trpN_{strp}}$, $\lceil \log_2 n_{RI} \rceil_{trp1_{jt}}$+ . . . +$\lceil \log_2 n_{RI} \rceil_{trpN_{jt}}$)), or max ($\lceil \log_2 n_{RI} \rceil_{trp1_{strp}}$, . . . , $\lceil \log_2 n_{RI} \rceil_{trpN_{strp}}$, $\lceil \log_2 n_{RI} \rceil_{trp1_{jt}}$+ . . . +$\lceil \log_2 n_{RI} \rceil_{trpN_{jt}}$);

a second value, where the second value includes 0, or min(1, max($\lceil \log_2 n_{RI} \rceil_{trp1_{strp}}$, . . . , $\lceil \log_2 n_{RI} \rceil_{trpN_{strp}}$, $\lceil \log_2 N_{RI\_jt} \rceil$)), or min(2, max($\lceil \log_2 n_{RI} \rceil_{trp1_{strp}}$, . . . , $\lceil \log_2 n_{RI} \rceil_{trpN_{strp}}$, $\lceil \log_2 N_{RI\_jt} \rceil$)) or $\lceil \log_2 n_{RI} \rceil_{trpN_{strp}}$, $\lceil \log_2 N_{RI\_jt} \rceil$)), or min(4, max($\lceil \log_2 n_{RI} \rceil_{trp1_{strp}}$, $\lceil \log_2 n_{RI} \rceil_{trpN_{strp}}$, $\lceil \log_2 N_{RI\_jt} \rceil$)); or min($\lceil \log_2 n_{RI} \rceil_{trp1_{strp}}$, $\lceil \log_2 n_{RI} \rceil_{trpN_{strp}}$, $\lceil \log_2 N_{RI\_jt} \rceil$), where $N_{RI\_jt}$ represents the total quantity of supported rank indicator combinations; and a third value, where the third value includes 0 or $\lceil \log_2 N_{RI} \rceil$, where $N_{RI}$ represents the total quantity of supported rank indicators or rank indicator combinations, where $\lceil \log_2 n_{RI} \rceil_{trp1_{strp}}$ represents a bitwidth corresponding to a quantity of rank indicators allowed for STRP transmission of a first TRP, $\lceil \log_2 n_{RI} \rceil_{trp1_{ncjt}}$ represents a bitwidth corresponding to a quantity of rank indicators allowed for joint transmission of the first TRP, $\lceil \log_2 n_{RI} \rceil_{trpN_{strp}}$ represents a bitwidth corresponding to a quantity of rank indicators allowed for STRP transmission of an $N^{th}$ TRP, $\lceil \log_2 n_{RI} \rceil_{trpN_{ncjt}}$ represents a bitwidth corresponding to a quantity of rank indicators allowed for joint transmission of the $N^{th}$ TRP, and N is greater than or equal to 2.

In an implementation of this application, in a case that the bitwidth of the RI field is the first value, if the first measurement hypothesis is an STRP measurement hypothesis, one code point of the RI field corresponds to one rank indicator, or if the first measurement hypothesis is a joint transmission measurement hypothesis, first $\lceil \log_2 n_{RI} \rceil_{trp1_{jt}}$ bits of the RI field correspond to one rank indicator of the first TRP, and $\lceil \log_2 n_{RI} \rceil_{trpN_{jt}}$ bits after the first $\lceil \log_2 n_{RI} \rceil_{trp1_{jt}}$ bits correspond to one rank indicator of the $N^{th}$ TRP, or first $\lceil \log_2 n_{RI} \rceil_{trp1_{jt}}$ bits of the RI field correspond to one rank indicator of the first TRP, and last $\lceil \log_2 n_{RI} \rceil_{trpN_{jt}}$ bits of the RI field correspond to one rank indicator of the $N^{th}$ TRP;

or in a case that the bitwidth of the RI field is the second value, if the first measurement hypothesis is an STRP measurement hypothesis, one code point of the RI field corresponds to one rank indicator, or if the first measurement hypothesis is a joint transmission measurement hypothesis, one code point of the RI field corresponds to a group of rank indicators;

or in a case that the bitwidth of the RI field is the third value, one code point of the RI field corresponds to one rank indicator or corresponds to a group of rank indicators.

In an implementation of this application, in a case that the first measurement hypothesis is one of all the STRP measurement hypotheses and joint transmission measurement hypotheses, a bitwidth of the CRI field in the CSI report is $\lceil \log_2(K_s+N) \rceil$, where $K_s$ represents a quantity of channel measurement resources associated with a reporting setting, and N represents a quantity of CMR pairs associated with the reporting setting.

In an implementation of this application, the apparatus 500 further includes:

a third receiving module, configured to: in a case that the first measurement hypothesis is one of all the STRP measurement hypotheses and joint transmission measurement hypotheses, obtain, by using the first field in the CSI report, that a type of the first measurement hypothesis is an STRP measurement hypothesis or a joint transmission measurement hypothesis, where the first field is a CRI field, an RI field, or a newly defined indicator field.

In an implementation of this application, in a case that the first measurement hypothesis includes the X STRP measurement hypotheses and the one joint transmission measurement hypothesis, a quantity of RI fields in the CSI report is:

X+1, where X RI fields correspond to the X STRP measurement hypotheses, and one RI field corresponds to the one joint transmission measurement hypothesis;

X+2, where X RI fields correspond to the X STRP measurement hypotheses, and two RI fields correspond to the one joint transmission measurement hypothesis;

1, where one RI field corresponds to the X STRP measurement hypotheses and the one joint transmission measurement hypothesis; or 2, where one RI field corresponds to the X STRP measurement hypotheses, and one RI field corresponds to the one joint transmission measurement hypothesis.

In an implementation of this application, in a case that the quantity of RI fields is X+1 or X+2, a sequence of mapping the joint transmission measurement hypothesis and STRP measurement hypotheses to the RI fields includes: the joint transmission measurement hypothesis takes precedence over the STRP measurement hypotheses, or the STRP measurement hypotheses take precedence over the joint transmission measurement hypothesis.

In an implementation of this application, in a case that the quantity of RI fields is X+1, a first RI field corresponds to the one joint transmission measurement hypothesis, and a bitwidth of the first RI field is determined based on one or more of the following:

a quantity of antenna ports;

a bitwidth corresponding to a quantity of rank indicators allowed for joint transmission;

a total quantity of rank indicators supported by the terminal; and a total quantity of rank indicator combinations supported by the terminal.

The total quantity of rank indicators supported by the terminal may be understood as the quantity of rank indicators supported by the terminal for joint transmission. The total quantity of rank indicator combinations supported by the terminal may be understood as the quantity of rank indicator combinations supported by the terminal for joint transmission. Support may also be understood as permission.

In an implementation of this application, the bitwidth of the first RI field is one of the following:

a fourth value, where the fourth value includes 0, or $\min(1, \lceil \log_2 n_{RI} \rceil_{trp1_{jt}} + \ldots + \lceil \log_2 n_{RI} \rceil_{trpN_{jt}})$, or $\min(2, \lceil \log_2 n_{RI} \rceil_{trp1_{jt}} + \ldots + \lceil \log_2 n_{RI} \rceil_{trpN_{jt}})$, or $\min(3, \lceil \log_2 n_{RI} \rceil_{trp1_{jt}} + \ldots + \lceil \log_2 n_{RI} \rceil_{trpN_{jt}})$, or $\min(4, \lceil \log_2 n_{RI} \rceil_{trp1_{jt}} + \ldots + \lceil \log_2 n_{RI} \rceil_{trpN_{jt}})$, or $\lceil \log_2 n_{RI} \rceil_{trp1_{jt}} + \ldots + \lceil \log_2 n_{RI} \rceil_{trpN_{jt}}$, where $\lceil \log_2 n_{RI} \rceil_{trp1_{jt}}$ represents a bitwidth corresponding to a quantity of rank indicators allowed for joint transmission of a first TRP, and $\lceil \log_2 n_{RI} \rceil_{trpN_{jt}}$ represents a bitwidth corresponding to a quantity of rank indicators allowed for joint transmission of an $N^{th}$ TRP; and a fifth value, where the fifth value includes 0, or $\min(1, \lceil \log_2 N_{RI\_jt} \rceil)$, or $\min(2, \lceil \log_2 N_{RI\_jt} \rceil)$, or $\min(3, \lceil \log_2 N_{RI\_jt} \rceil)$, or $\min(4, \lceil \log_2 N_{RI\_jt} \rceil)$, or $\lceil \log_2 N_{RI\_jt} \rceil$, where $N_{RI\_jt}$ represents the total quantity of supported rank indicator combinations.

In an implementation of this application, in a case that the bitwidth of the first RI field is the fourth value, first $\lceil \log_2 n_{RI} \rceil_{trp1_{jt}}$ bits of the first RI field correspond to one rank indicator of the first TRP, and $\lceil \log_2 n_{RI} \rceil_{trp2_{jt}}$ bits after the first $\lceil \log_2 n_{RI} \rceil_{trp1_{jt}}$ bits correspond to one rank indicator of the $N^{th}$ TRP;

or first $\lceil \log_2 n_{RI} \rceil_{trp1_{jt}}$ bits of the first RI field correspond to one rank indicator of the first TRP, and last $\lceil \log_2 n_{RI} \rceil_{trp2_{jt}}$ bits of the first RI field correspond to one rank indicator of a second TRP;

or in a case that the bitwidth of the first RI field is the fifth value, one code point of the first RI field corresponds to a group of rank indicators, where N is greater than or equal to 2.

In an implementation of this application, in a case that the quantity of RI fields is X+1 or X+2, and X=1, a second RI field corresponds to one STRP measurement hypothesis, and a bitwidth of the second RI field is determined based on one or more of the following:

a quantity of antenna ports; and a bitwidth corresponding to a quantity of rank indicators allowed for STRP transmission.

In an implementation of this application, the bitwidth of the second RI field is a sixth value; and the sixth value includes 0, or $\min(1, \max(\lceil \log_2 n_{RI} \rceil_{trp1_{strp}}, \ldots, \lceil \log_2 n_{RI} \rceil_{trpN_{strp}}))$, or $\min(2, \max(\lceil \log_2 n_{RI} \rceil_{trp1_{strp}}, \ldots, \lceil \log_2 n_{RI} \rceil_{trpN_{strp}}))$, or $\min(3, \max(\lceil \log_2 n_{RI} \rceil_{trp1_{strp}}) \ldots, \lceil \log_2 n_{RI} \rceil_{trpN_{strp}}))$, or $\min(4, \max(\lceil \log_2 n_{RI} \rceil_{trp1_{strp}}, \ldots, \lceil \log_2 n_{RI} \rceil_{trpN_{strp}}))$, or $\max(\lceil \log_2 n_{RI} \rceil_{trp1_{strp}}, \ldots, \lceil \log_2 n_{RI} \rceil_{trpN_{strp}})$, where $\lceil \log_2 n_{RI} \rceil_{trp1_{strp}}$ represents a bitwidth corresponding to a quantity of rank indicators allowed for STRP transmission of a first TRP, and $\lceil \log_2 n_{RI} \rceil_{trpN_{strp}}$ represents a bitwidth corresponding to a quantity of rank indicators allowed for STRP transmission of an $N^{th}$ TRP; and N is greater than or equal to 2.

In an implementation of this application, in a case that there is only one RI field, a bitwidth of the RI field is determined based on one or more of the following:

a quantity of antenna ports;

a bitwidth corresponding to a quantity of rank indicators allowed for STRP transmission;

a total quantity of rank indicator combinations supported by the terminal; and a bitwidth corresponding to a quantity of rank indicators allowed for joint transmission.

The total quantity of rank indicator combinations supported by the terminal may be understood as the quantity of rank indicator combinations supported by the terminal for STRP transmission, and/or the quantity of rank indicator combinations supported for joint transmission. Support may also be understood as permission.

In an implementation of this application, the bitwidth of the RI field is one of the following:

a seventh value, where the seventh value includes 0, or $\min(1, \lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{jt}} + \ldots + \lceil \log_2 n_{RI} \rceil_{trpN_{jt}})$, or $\min(2, \lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{jt}} + \ldots + \lceil \log_2 n_{RI} \rceil_{trpN_{jt}})$, or $\min(3, \lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{jt}} + \ldots + \lceil \log_2 n_{RI} \rceil_{trpN_{jt}})$, or $\min(4, \lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{jt}} + \ldots + \lceil \log_2 n_{RI} \rceil_{trpN_{jt}})$, or $\lceil \log_2 n_{RI} \rceil_{trp1_{strp}} + \ldots + \lceil \log_2 n_{RI} \rceil_{trpN_{strp}} + \lceil \log_2 n_{RI} \rceil_{trp1_{ncjt}} + \ldots + \lceil \log_2 n_{RI} \rceil_{trpN_{jt}}$; and an eighth value, where the eighth value includes 0, or $\min(1, \lceil \log_2 n_{RI} \rceil_{trp1_{strp}} + \ldots + \lceil \log_2 n_{RI} \rceil_{trpN_{strp}} + \lceil \log_2 N_{RI\_jt} \rceil)$, or $\min(2, \lceil \log_2 n_{RI} \rceil_{trp1_{strp}} + \ldots + \lceil \log_2 n_{RI} \rceil_{trpN_{strp}} + \lceil \log_2 N_{RI\_jt} \rceil)$, or $\min(3, \log_2 n_{RI} \rceil_{trp1_{strp}} + \ldots + \lceil \log_2 n_{RI} \rceil_{trpN_{strp}} + \lceil \log_2 N_{RI\_jt} \rceil)$, or $\min(4, \lceil \log_2 n_{RI} \rceil_{trp1_{strp}} + \ldots + \lceil \log_2 n_{RI} \rceil_{trpN_{strp}} + \lceil \log_2 N_{RI\_jt} \rceil)$, or $\lceil \log_2 n_{RI} \rceil_{trp1_{strp}} + \ldots + \lceil \log_2 n_{RI} \rceil_{trpN_{strp}} + \lceil \log_2 n_{RI\_jt} \rceil$, where $N_{RI\_jt}$ represents the total quantity of supported rank indicator combinations;

$\lceil \log_2 N_{RI} \rceil_{trp1_{strp}}$ represents a bitwidth corresponding to a quantity of rank indicators allowed for STRP transmission of a first TRP, $\lceil \log_2 n_{RI} \rceil_{trp1_{jt}}$ represents a bitwidth corresponding to a quantity of rank indicators allowed for joint transmission of the first TRP, $\lceil \log_2 n_{RI} \rceil_{trpN_{strp}}$ represents a bitwidth corresponding to a quantity of rank indicators allowed for STRP transmission of an $N^{th}$ TRP, and $\lceil \log_2 n_{RI} \rceil_{trpN_{jt}}$ represents a bitwidth corresponding to a quantity of rank indicators allowed for joint transmission of the $N^{th}$ TRP; and N is greater than or equal to 2.

In an implementation of this application, the apparatus 500 further includes:

a second sending module, configured to send higher layer signaling, where the higher layer signaling is used to limit the first field in the CSI report, and the higher layer signaling is in a one-to-correspondence with a TRP, or there is a mapping relationship between the higher layer signaling and a CMR or a CMR group.

In an implementation of this application, a manner of mapping the STRP measurement hypothesis to the CSI report includes:

a PMI granularity and a CQI granularity in the CSI report are wideband, and mapping content of the STRP measurement hypothesis in the CSI report includes one or more of the following: a CRI, a newly defined indicator, an RI, an LI, a PMI, and a CQI;

alternatively, a manner of mapping the joint transmission measurement hypothesis to the CSI report includes:

a PMI granularity and a CQI granularity in the CSI report are wideband, and mapping content of the joint transmission measurement hypothesis in the CSI report includes one or more of the following: one or more CRIs, a newly defined indicator field, one or more RIs, one or more LIs, one or more PMIs, and one or more CQIs;

alternatively, a manner of mapping the joint transmission measurement hypothesis to the CSI report includes:

a PMI granularity and a CQI granularity in the CSI report are wideband, and mapping content of the joint transmission measurement hypothesis in the CSI report includes a first part and a second part, where the first part includes one or more of the following: one CRI, a newly defined indicator, a plurality of RIs, one LI, one PMI, and one CQI; and the second part includes one or more of the following: one LI, one PMI, and one CQI;

or the first part includes one or more of the following: a plurality of CRIs, a plurality of RIs, one LI, one PMI, and one CQI; and the second part includes one or more of the following: one LI, one PMI, and one CQI;

or the first part includes one or more of the following: one CRI, a plurality of RIs, one LI, one PMI, and one CQI; and the second part includes one or more of the following: one LI, one PMI, and one CQI;

alternatively, a manner of mapping the STRP measurement hypothesis to the CSI report includes:

a PMI granularity and a CQI granularity in the CSI report are subband, and mapping content of the STRP measurement hypothesis in the CSI report includes a first part, a second part and a third part, where the first part includes one or more of the following: one CRI, one newly defined indicator, one RI, a wideband channel quality indicator for first transport block, a subband channel quality indicator for first transport block, and one non-zero wideband amplitude coefficient; the second part includes one or more of the following: a wideband channel quality indicator for second transport block, one LI, and one wideband precoding matrix indicator; and the third part includes one or more of the following: an even subband channel quality indicator for second transport block, an even subband precoding matrix indicator, an odd subband channel quality indicator for second transport block, and an odd subband precoding matrix indicator;

or the first part includes one or more of the following: one CRI, one RI, a wideband channel quality indicator for first transport block, a subband channel quality indicator for first transport block, and a non-zero wideband amplitude coefficient; the second part includes one or more of the following: a wideband channel quality indicator for second transport block, one LI, and one wideband precoding matrix indicator; and the third part includes one or more of the following: an even subband channel quality indicator for second transport block, an even subband precoding matrix indicator, an odd subband channel quality indicator for second transport block, and an odd subband precoding matrix indicator;

alternatively, a manner of mapping the joint transmission measurement hypothesis to the CSI report includes:

a PMI granularity and a CQI granularity in the CSI report are subband, and mapping content of the NCJT measurement hypothesis in the CSI report includes a first part, a second part and a third part, where the first part includes one or more of the following: one CRI, a newly defined indicator, one or more RIs, a wideband channel quality indicator for first transport block, a subband channel quality indicator for first transport block, and one or more non-zero wideband amplitude coefficients; the second part includes one or more of the following: a wideband channel quality indicator for second transport block, one or more LIs, one or more wideband precoding matrix indicators, and wideband channel quality indicators for a plurality of transport blocks; and the third part includes one or more of the following: an even subband channel quality indicator for second transport block, a plurality of even subband precoding matrix indicators, a plurality of second even subband channel quality indicators for transport blocks, a plurality of second odd subband channel quality indicators for transport blocks, a plurality of odd subband precoding matrix indicators, an odd subband channel quality indicator for first transport block, and an odd subband channel quality indicator for second transport block;

or the first part includes one or more of the following: one or more CRIs, one or more RI fields, a wideband channel quality indicator for first transport block, a subband channel quality indicator for first transport block, and one or more non-zero wideband amplitude coefficients; the second part includes one or more of the following: a wideband channel quality indicator for second transport block, one or more LIs, a plurality of wideband precoding matrix indicators, a wideband channel quality indicator for first transport block, and a wideband channel quality indicator for second transport block; and the third part includes one or more of the following: an even subband channel quality indicator for second transport block, a plurality of even subband precoding matrix indicators, an even subband channel quality indicator for first transport block, an even subband channel quality indicator for second transport block, one even subband precoding matrix indicator, an odd subband channel quality indicator for second transport block, a plurality of odd subband precoding matrix indicators, and odd subband channel quality indicators for a plurality of transport blocks;

or the first part includes one or more of the following: a CRI, one or more RIs, a wideband channel quality indicator for first transport block, a subband channel quality indicator for first transport block, and one or more non-zero wideband amplitude coefficients; the second part includes one or more of the following: wideband channel quality indicators for a plurality of second transport blocks, one or more LIs, one or more wideband precoding matrix indicators, a wideband channel quality indicator for first transport block, and a wideband channel quality indicator for second transport block; and the third part includes one or more of the following: an even subband channel quality indicator for second transport block, one or more even wideband precoding matrix indicators, a subband channel quality indicator for first transport block, a subband channel quality indicator for second transport block, a plurality of second odd subband channel quality indicators for transport blocks, one or more odd wideband precoding matrix indicators, and an odd subband channel quality indicator for first transport block.

In an implementation of this application, the CSI report includes one or more of the following:

mapping content of at least some joint transmission measurement hypotheses; and mapping content of at least some STRP measurement hypotheses.

In an implementation of this application, a transmission priority of each CSI report in the plurality of CSI reports includes one or more of the following:

for a plurality of aperiodic CSI reports reported based on a PUSCH, all of which do not carry L1-RSRPs or L1-SINRs, a priority of an MTRP CSI report is higher than a priority of a non-MTRP CSI report;

for a plurality of semi-persistent CSI reports reported based on a PUSCH, all of which do not carry L1-RSRPs or L1-SINRs, a priority of an MTRP CSI report is higher than a priority of a non-MTRP CSI report;

for a plurality of semi-persistent CSI reports reported based on a PUCCH, all of which do not carry L1-RSRPs or L1-SINRs, a priority of an MTRP CSI report is higher than a priority of a non-MTRP CSI report; and for a plurality of periodic CSI reports reported based on a PUCCH, all of which do not carry L1-RSRPs or L1-SINRs, a priority of an MTRP CSI report is higher than a priority of a non-MTRP CSI report.

In an implementation of this application, the transmission priority of the CSI content in the MTRP CSI reports includes one or more of the following:

a transmission priority of the joint transmission measurement hypothesis is higher than a transmission priority of the STRP measurement hypothesis; and transmission priorities of the wideband information of the joint transmission measurement hypothesis and the wideband information of the STRP measurement hypothesis are higher than transmission priorities of the subband information of the joint transmission measurement hypothesis and the subband information of the STRP measurement hypothesis.

The transmission apparatus in this embodiment of this application may be an apparatus, an apparatus with an operating system or an electronic device, or may be a component, an integrated circuit, or a chip in a network-side device. The apparatus or electronic device may be a base station, or may be another network-side device.

The apparatus provided in this embodiment of this application can implement each process implemented by the method embodiment in FIG. 3, with the same technical effect achieved. To avoid repetition, details are not described herein again.

Figure 6:
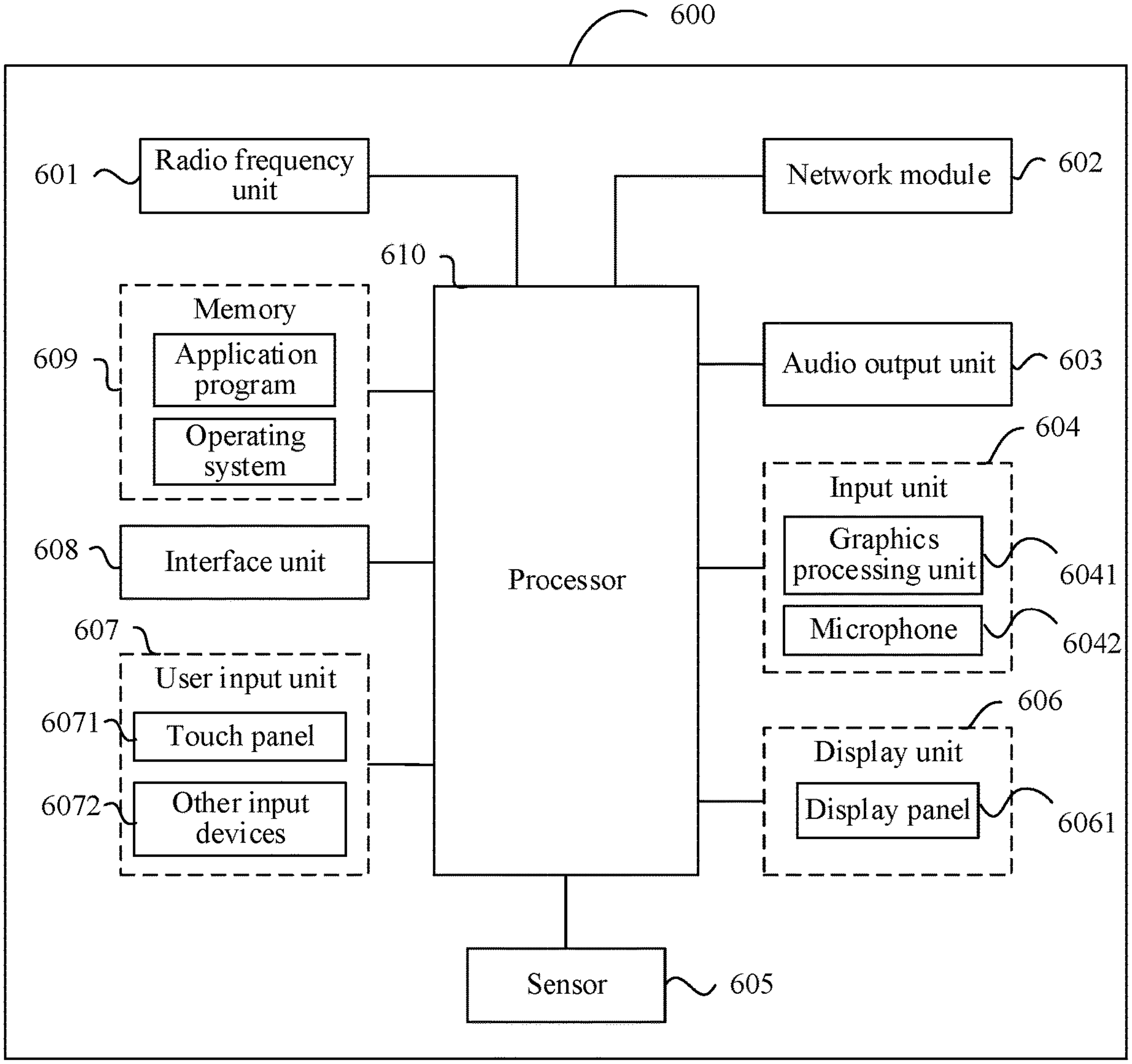
FIG. 6 is a schematic diagram of a terminal according to an embodiment of this application.

An embodiment of this application further provides a terminal, including a processor and a communications interface. The communications interface is configured to feed back one or more CSI reports to a network-side device, where a first field in the CSI report represents a first measurement hypothesis, where the first measurement hypothesis includes: X STRP measurement hypotheses and one joint transmission measurement hypothesis, where X is a natural number; or the first measurement hypothesis is one of all STRP measurement hypotheses and joint transmission measurement hypotheses. The terminal embodiment corresponds to the foregoing terminal-side method embodiment, and each implementation process and implementation of the foregoing method embodiment can be applied to the terminal embodiment, with the same technical effect achieved. Specifically, FIG. 6 is a schematic diagram of a hardware structure of a terminal for implementing an embodiment of this application. The terminal 600 includes but is not limited to at least some components such as a radio frequency unit 601, a network module 602, an audio output unit 603, an input unit 604, a sensor 605, a display unit 606, a user input unit 607, an interface unit 608, a memory 609, and a processor 610.

A person skilled in the art may understand that the terminal 600 may further include a power supply (for example, a battery) supplying power to all components. The power supply may be logically connected to the processor 610 through a power management system. In this way, functions such as charge management, discharge management, and power consumption management are implemented by using the power management system. The terminal structure shown in FIG. 6 does not constitute a limitation on the terminal. The terminal may include more or fewer components than those shown in the figure, or some components are combined, or component arrangements are different. Details are not described herein again.

It should be understood that, in this embodiment of this application, the input unit 604 may include a graphics processing unit (GPU) 6041 and a microphone 6042. The graphics processing unit 6041 processes image data of a still picture or video obtained by an image capture apparatus (such as a camera) in a video capture mode or an image capture mode. The display unit 606 may include a display panel 6061, and the display panel 6061 may be configured in a form of a liquid crystal display, an organic light-emitting diode, or the like. The user input unit 607 includes a touch panel 6071 and other input devices 6072. The touch panel 6071 is also referred to as a touchscreen. The touch panel 6071 may include two parts: a touch detection apparatus and a touch controller. The other input devices 6072 may include but are not limited to a physical keyboard, a function key (such as a volume control key or a switch key), a trackball, a mouse, and a joystick. Details are not described herein again.

In this embodiment of this application, after receiving downlink data from a network-side device, the radio frequency unit 601 sends the downlink data to the processor 610 for processing, and in addition, sends uplink data to the network-side device. Generally, the radio frequency unit 601 includes but is not limited to an antenna, at least one amplifier, a transceiver, a coupler, a low noise amplifier, a duplexer, and the like.

The memory 609 may be configured to store software programs or instructions and various data. The memory 609 may primarily include a program or instruction storage area and a data storage area. The program or instruction storage area may store an operating system, an application program or instructions (such as an audio play function and an image play function) required by at least one function, and the like. In addition, the memory 609 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device.

The processor 610 may include one or more processing units. Optionally, the processor 610 may integrate an application processor and a modem processor. The application processor mainly processes the operating system, a user interface, an application program, or instructions. The modem processor mainly processes wireless communication. For example, the modem processor is a baseband processor. It may be understood that the modem processor may alternatively be not integrated in the processor 610.

The terminal provided in this embodiment of this application can implement each process implemented by the method embodiment in FIG. 2, with the same technical effect achieved. To avoid repetition, details are not described herein again.

An embodiment of this application further provides a network-side device, including a processor and a communications interface. The communications interface is configured to receive one or more CSI reports, where the CSI report includes a first field corresponding to a first measurement hypothesis, where the first measurement hypothesis includes: X STRP measurement hypotheses and one joint transmission measurement hypothesis, where X is a positive integer; or the first measurement hypothesis is one of all STRP measurement hypotheses and joint transmission measurement hypotheses. The network-side device embodiment corresponds to the foregoing method embodiment of the network-side device, and each implementation process and implementation of the foregoing method embodiment can be applied to the network-side device embodiment, with the same technical effect achieved.

Figure 7:
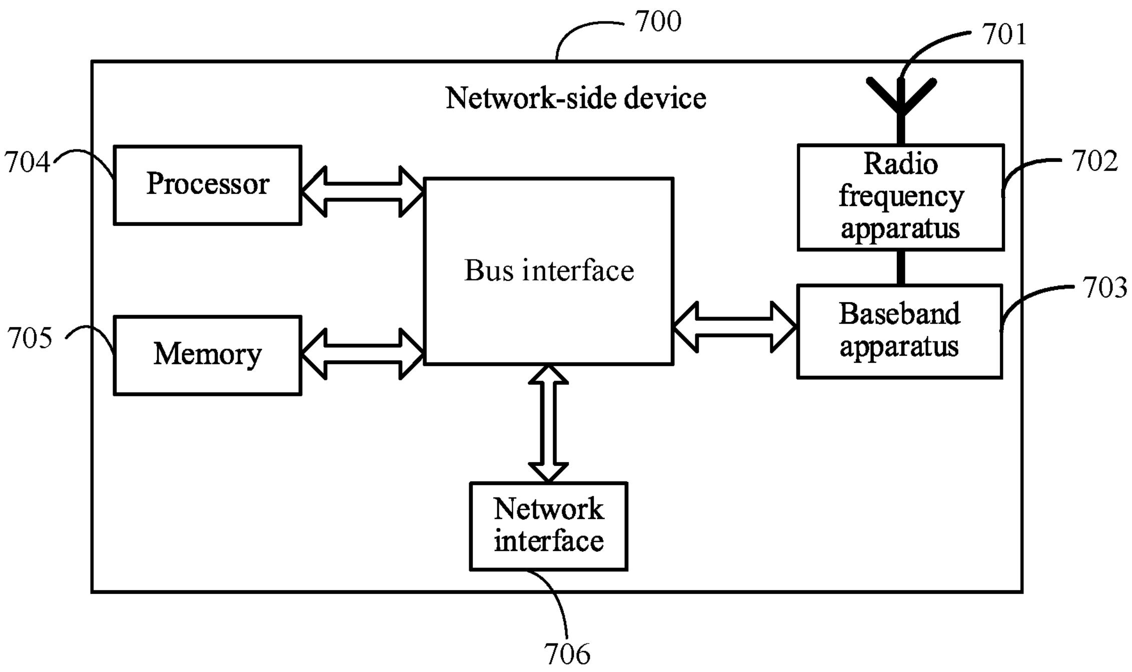
FIG. 7 is a schematic diagram of a network-side device according to an embodiment of this application.

Specifically, an embodiment of this application further provides a network-side device. As shown in FIG. 7, the network-side device 700 includes an antenna 701, a radio frequency apparatus 702, and a baseband apparatus 703. The antenna 701 is connected to the radio frequency apparatus 702. In an uplink direction, the radio frequency apparatus 702 receives information by using the antenna 701, and sends the received information to the baseband apparatus 703 for processing. In a downlink direction, the baseband apparatus 703 processes to-be-sent information, and sends the information to the radio frequency apparatus 702; and the radio frequency apparatus 702 processes the received information and then sends the information out by using the antenna 701.

The frequency band processing apparatus may be located in the baseband apparatus 703. The method performed by the network-side device in the foregoing embodiment may be implemented in the baseband apparatus 703, and the baseband apparatus 703 includes a processor 704 and a memory 705.

The baseband apparatus 703 may include, for example, at least one baseband processing unit, where a plurality of chips are disposed on the baseband processing unit. As shown in FIG. 7, one of the chips is, for example, the processor 704, connected to the memory 705, to invoke a program in the memory 705 to perform the operation of the network device shown in the foregoing method embodiment.

The baseband apparatus 703 may further include a network interface 706, configured to exchange information with the radio frequency apparatus 702, where the interface is, for example, a common public radio interface (common public radio interface, CPRI for short).

Specifically, the network-side device in this embodiment of this application further includes a program or instructions stored in the memory 705 and capable of running on the processor 704. When the processor 704 invokes the program or instructions in the memory 705, the method performed by each module shown in FIG. 5 is performed, with the same technical effect achieved. To avoid repetition, details are not described herein again.

An embodiment of this application further provides a computer program or a program product. The computer program or program product is stored in a non-volatile storage medium. The computer program or program product is executed by at least one processor to implement the steps of the foregoing processing method in FIG. 2 or FIG. 3.

An embodiment of this application further provides a readable storage medium. The readable storage medium stores a program or instructions. When the program or instructions are executed by a processor, each process of the foregoing method embodiment shown in FIG. 2 or FIG. 3 is implemented, with the same technical effect achieved. To avoid repetition, details are not described herein again.

The processor is a processor in the terminal in the foregoing embodiment. The readable storage medium includes a computer-readable storage medium, for example, a computer read-only memory (ROM), a random access memory (RAM), a magnetic disk, or an optical disc.

An embodiment of this application further provides a chip. The chip includes a processor and a communications interface. The communications interface is coupled to the processor. The processor is configured to run a program or instructions to implement each process of the foregoing method embodiment shown in FIG. 3 or FIG. 4, with the same technical effect achieved. To avoid repetition, details are not described herein again.

It should be understood that the chip provided in this embodiment of this application may also be referred to as a system-level chip, a system chip, a chip system, a system-on-chip, or the like.

An embodiment of this application provides an electronic device, configured to perform each process of the foregoing method embodiment, with the same technical effect achieved. To avoid repetition, details are not described herein again.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A channel state information (CSI) feedback method, comprising:

feeding back, by a terminal, one or more CSI reports to a network-side device, wherein the CSI report comprises a rank indicator (RI) field and a channel state information reference signal resource indicator (CRI) field corresponding to a first measurement hypothesis, wherein the first measurement hypothesis comprises: X single transmission and reception point (STRP) measurement hypotheses and one joint transmission measurement hypothesis, wherein X is a natural number; or the first measurement hypothesis is one of all STRP measurement hypotheses and joint transmission measurement hypotheses;

in a case that the first measurement hypothesis is one of all the STRP measurement hypotheses and joint transmission measurement hypotheses, indicating, by the terminal to the network-side device by using the CRI field in the CSI report, that a type of the first measurement hypothesis is an STRP measurement hypothesis or a joint transmission measurement hypothesis;

in a case that the first measurement hypothesis comprises the X STRP measurement hypotheses and the one joint transmission measurement hypothesis, a quantity of RI fields in the CSI report is: X+1, wherein X RI fields correspond to the X STRP measurement hypotheses, and one RI field corresponds to the one joint transmission measurement hypothesis.

2. The method according to claim 1, wherein in a case that the first measurement hypothesis is one of all the STRP measurement hypotheses and joint transmission measurement hypotheses, a bitwidth of the RI field is determined based on one or more of the following:

a quantity of antenna ports;

a total quantity of rank indicators supported by the terminal; or a total quantity of rank indicator combinations supported by the terminal.

3. The method according to claim 2, wherein the bitwidth of the RI field is a third value, wherein the third value comprises 0 or $\lceil \log_2 N_{RI} \rceil$, wherein $N_{RI}$ represents the total quantity of supported rank indicators or rank indicator combinations.

4. The method according to claim 1, wherein in a case that the first measurement hypothesis is one of all the STRP measurement hypotheses and joint transmission measurement hypotheses, a bitwidth of the CRI field is $\lceil \log_2(K_s+N) \rceil$, wherein $K_s$ represents a quantity of channel measurement resources associated with a reporting setting, and N represents a quantity of channel measurement resource (CMR) pairs associated with the reporting setting.

5. The method according to claim 1, wherein in a case that the quantity of RI fields is X+1, a sequence of mapping the joint transmission measurement hypothesis and STRP measurement hypotheses to the RI fields comprises: the joint transmission measurement hypothesis takes precedence over the STRP measurement hypotheses, or the STRP measurement hypotheses take precedence over the joint transmission measurement hypothesis.

6. The method according to claim 1, wherein in a case that the quantity of RI fields is X+1, a first RI field corresponds to the one joint transmission measurement hypothesis, and a bitwidth of the first RI field is determined based on one or more of the following:

a quantity of antenna ports; or a total quantity of rank indicator combinations supported by the terminal.

7. The method according to claim 6, wherein the bitwidth of the first RI field is a fifth value, wherein the fifth value comprises 0, or $\min(2, \lceil \log_2 N_{RI\_jt} \rceil)$, wherein $N_{RI\_jt}$ represents the total quantity of supported rank indicator combinations.

8. The method according to claim 7, wherein in a case that the bitwidth of the first RI field is the fourth value, first $\lceil \log_2 n_{RI} \rceil_{trp1_{jt}}$ bits of the first RI field correspond to one rank indicator of the first TRP, and $\lceil \log_2 N_{RI} \rceil_{trp2_{jt}}$ bits after the first $\lceil \log_2 N_{RI} \rceil_{trp1_{jt}}$ bits correspond to one rank indicator of the second TRP;

or first $\lceil \log_2 N_{RI} \rceil_{trp1_{jt}}$ bits of the first RI field correspond to one rank indicator of the first TRP, and last $\lceil \log_2 N_{RI} \rceil_{trp2_{jt}}$ bits of the first RI field correspond to one rank indicator of a second TRP;

or in a case that the bitwidth of the first RI field is the fifth value, one code point of the first RI field corresponds to a group of rank indicators, wherein N is greater than or equal to 2.

9. The method according to claim 1, wherein in a case that the quantity of RI fields is X+1 and X=1, a second RI field corresponds to one STRP measurement hypothesis, and a bitwidth of the second RI field is determined based on one or more of the following:

a quantity of antenna ports; or a bitwidth corresponding to a quantity of rank indicators allowed for STRP transmission.

10. The method according to claim 1, wherein a manner of mapping the joint transmission measurement hypothesis to the CSI report comprises:

a PMI granularity and a CQI granularity in the CSI report are wideband, and mapping content of the joint transmission measurement hypothesis in the CSI report comprises one or more of the following: one or more CRIs, one RI, more PMIs, or one CQI.

11. The method according to claim 10, wherein the CSI report comprises one or more of the following:

mapping content of at least some joint transmission measurement hypotheses; or mapping content of at least some STRP measurement hypotheses.

12. The method according to claim 1, wherein the method further comprises:

when the plurality of CSI reports comprise MTRP CSI reports, determining, by the terminal, a transmission priority of CSI content in the MTRP CSI reports.

13. The method according to claim 12, wherein the transmission priority of the CSI content in the MTRP CSI reports comprises a transmission priority of a joint transmission measurement hypothesis is higher than a transmission priority of one STRP measurement hypothesis.

14. A terminal, comprising a processor, a memory, and a program stored in the memory and capable of running on the processor, wherein the program, when being executed by the processor, implements:

feeding back one or more channel state information (CSI) reports to a network-side device, wherein the CSI report comprises a rank indicator (RI) field and a channel state information reference signal resource indicator (CRI) field corresponding to a first measurement hypothesis, wherein the first measurement hypothesis comprises: X single transmission and reception point (STRP) measurement hypotheses and one joint transmission measurement hypothesis, wherein X is a natural number; or the first measurement hypothesis is one of all STRP measurement hypotheses and joint transmission measurement hypotheses;

in a case that the first measurement hypothesis is one of all the STRP measurement hypotheses and joint transmission measurement hypotheses, indicating, by the terminal to the network-side device by using the CRI field in the CSI report, that a type of the first measurement hypothesis is an STRP measurement hypothesis or a joint transmission measurement hypothesis;

in a case that the first measurement hypothesis comprises the X STRP measurement hypotheses and the one joint transmission measurement hypothesis, a quantity of RI fields in the CSI report is: X+1, wherein X RI fields correspond to the X STRP measurement hypotheses, and one RI field corresponds to the one joint transmission measurement hypothesis.

15. The terminal according to claim 14, wherein in a case that the first measurement hypothesis is one of all the STRP measurement hypotheses and joint transmission measurement hypotheses, a bitwidth of the RI field is determined based on one or more of the following:

a quantity of antenna ports;

a total quantity of rank indicators supported by the terminal; or a total quantity of rank indicator combinations supported by the terminal.

16. The terminal according to claim 15, wherein the bitwidth of the RI field is a third value, wherein the third value comprises 0 or $\lceil \log_2 N_{RI} \rceil$, wherein $N_{RI}$ represents the total quantity of supported rank indicators or rank indicator combinations.

17. A network-side device, comprising a processor, a memory, and a program stored in the memory and capable of running on the processor, wherein the program, when being executed by the processor, implements:

receiving one or more channel state information (CSI) reports, wherein the CSI report comprises a rank indicator (RI) field and a channel state information reference signal resource indicator (CRI) field corresponding to a first measurement hypothesis, wherein the first measurement hypothesis comprises: X single transmission and reception point (STRP) measurement hypotheses and one joint transmission measurement hypothesis, wherein X is a positive integer; or the first measurement hypothesis is one of all STRP measurement hypotheses and joint transmission measurement hypotheses;

in a case that the first measurement hypothesis is one of all the STRP measurement hypotheses and joint transmission measurement hypotheses, determining, by the network-side device using the CRI field in the CSI report, that a type of the first measurement hypothesis is an STRP measurement hypothesis or a joint transmission measurement hypothesis;

in a case that the first measurement hypothesis comprises the X STRP measurement hypotheses and the one joint transmission measurement hypothesis, a quantity of RI fields in the CSI report is: X+1, wherein X RI fields correspond to the X STRP measurement hypotheses, and one RI field corresponds to the one joint transmission measurement hypothesis.

18. The network-side device according to claim 17, wherein in a case that the first measurement hypothesis is one of all the STRP measurement hypotheses and joint transmission measurement hypotheses, a bitwidth of the RI field is determined based on one or more of the following:

a quantity of antenna ports;

a total quantity of rank indicators supported by the terminal; or a total quantity of rank indicator combinations supported by the terminal.

19. The network-side device according to claim 18, wherein the bitwidth of the RI field is a third value, wherein the third value comprises 0 or $\lceil \log_2 N_{RI} \rceil$, wherein $N_{RI}$ represents the total quantity of supported rank indicators or rank indicator combinations.

20. The network-side device according to claim 17, wherein in a case that the first measurement hypothesis is one of all the STRP measurement hypotheses and joint transmission measurement hypotheses, a bitwidth of the CRI field is $\lceil \log_2(K_s+N) \rceil$, wherein $K_s$ represents a quantity of channel measurement resources associated with a reporting setting, and N represents a quantity of channel measurement resource (CMR) pairs associated with the reporting setting.

* * * * *